United States Patent
Luo et al.

(10) Patent No.: US 9,531,514 B2
(45) Date of Patent: Dec. 27, 2016

(54) SOUNDING REFERENCE SIGNAL ENHANCEMENTS FOR WIRELESS COMMUNICATION

(75) Inventors: Xiliang Luo, Northridge, CA (US); Wanshi Chen, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 697 days.

(21) Appl. No.: 12/958,214

(22) Filed: Dec. 1, 2010

(65) Prior Publication Data

US 2011/0294529 A1 Dec. 1, 2011

Related U.S. Application Data

(60) Provisional application No. 61/266,456, filed on Dec. 3, 2009.

(51) Int. Cl.
*H04B 7/00* (2006.01)
*H04L 5/00* (2006.01)

(52) U.S. Cl.
CPC ........... *H04L 5/0048* (2013.01); *H04L 5/0035* (2013.01); *H04L 5/0007* (2013.01); *H04L 5/0094* (2013.01)

(58) Field of Classification Search
CPC .. H04L 5/0048; H04L 5/0051; H04L 25/0202; H04L 25/023; H04L 27/2613; H04L 5/006; H04L 1/0026; H04L 1/0027; H04L 1/20; H04L 25/0226; H04L 5/0055; H04W 24/00; H04W 56/00; H04W 72/04; H04W 72/0466; H04W 72/1273; H04W 72/042; H04W 72/0493
USPC ........... 455/69, 522, 509, 127.1, 63.1, 67.11, 455/436, 404.1, 466, 410, 450, 456.3, 455/115.1; 370/280, 312, 328, 259, 331, 370/252, 278, 329, 330, 254, 260, 315, 370/345, 336, 311, 203
See application file for complete search history.

(56) References Cited

U.S. PATENT DOCUMENTS

| | | | |
|---|---|---|---|
| 7,110,374 B2 | 9/2006 | Malhotra et al. | |
| 2006/0013338 A1* | 1/2006 | Gore et al. | 375/324 |
| 2006/0200862 A1 | 9/2006 | Olson et al. | |
| 2009/0031035 A1 | 1/2009 | Dharmaraju et al. | |
| 2009/0042616 A1* | 2/2009 | Teo et al. | 455/562.1 |
| 2009/0052382 A1 | 2/2009 | Stephenson et al. | |
| 2009/0109908 A1* | 4/2009 | Bertrand et al. | 370/329 |
| 2009/0239476 A1* | 9/2009 | Womack et al. | 455/68 |
| 2009/0257388 A1 | 10/2009 | Khandekar et al. | |
| 2010/0080187 A1* | 4/2010 | Papasakellariou et al. | 370/329 |

(Continued)

FOREIGN PATENT DOCUMENTS

| | | |
|---|---|---|
| CN | 101401338 A | 4/2009 |
| CN | 101436892 A | 5/2009 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.8.0 (Sep. 2009).

(Continued)

*Primary Examiner* — Golam Sorowar
(74) *Attorney, Agent, or Firm* — Liem T. Do

(57) ABSTRACT

A wireless communication method includes determining whether a wireless device desires dynamic sounding reference signal (SRS) resources and providing, based on the determination, a dynamic SRS resource allocation to the wireless device.

18 Claims, 17 Drawing Sheets

(56) References Cited

U.S. PATENT DOCUMENTS

| | | | |
|---|---|---|---|
| 2010/0240384 A1* | 9/2010 | Nobukiyo et al. | 455/452.1 |
| 2010/0246561 A1* | 9/2010 | Shin et al. | 370/345 |
| 2010/0329220 A1* | 12/2010 | Kim et al. | 370/336 |

FOREIGN PATENT DOCUMENTS

| | | | |
|---|---|---|---|
| EP | 2120378 | | 11/2009 |
| JP | 2009060595 A | | 3/2009 |
| JP | 2013509839 A | | 3/2013 |
| KR | 20040072706 A | | 8/2004 |
| WO | WO 2009057391 | * | 5/2009 .............. H04Q 7/38 |
| WO | WO-2011050856 A1 | | 5/2011 |

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213 V8.8.0 (Sep. 2009).
CMCC: "Consideration on enhanced 21-34 SRS-based feedback for CoMP", 3GPP Draft; RI-094821 Consideration on Enhanced SRS-Based Feedback for C0MPV2, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050389216.
Huawei: "Reliability analysis and 21-34 possible solutions on SRS for LTE-A", 3GPP Draft; RI-095062, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050389401.
International Search Report and Written Opinion—PCT/US2010/058767, International Search Authority—European Patent Office—Aug. 12, 2011.
LG Electronics: "UL sounding RS Operation", 3GPP Draft; RI-074727—Uplink Sounding RS, 3rd Generation Partnership Project (3GPP), Mobile Competence Centre ; 650, Route Des Lucioles; F-06921 Sophia-Antipolis Cedex ; France, vol. RAN WGI, No. Korea; Oct. 31, 2007, XP050108202, [retrieved on Oct. 31, 2007].
Mitsubishi Electric: "UL Sounding RS Control Signaling for Closed Loop Antenna Selection", 3GPP Draft; RI-080803, 3rd Generation Partnership Project (3GPP), Mobile Competence Centre ; 650, Route Des Lucioles ; F-06921 Sophia-Antipolis Cedex ; France, vol. RAN WGI, No. Sorrento, Italy; Feb. 5, 2008, XP050109286.
Nokia Siemens Networks et al: "Channel sounding enhancements for LTE-Advanced", 3GPP Draft; R1-094653, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050389058.
NTT Docomo et al: "Assignment Scheme for Sounding Reference Signals in E-UTRA Uplink", 3GPP Draft; RI-074806 UL Sounding RS Assignment, 3rd Generation Partnership Project (3GPP), Mobile Competence Centre ; 650, Route Des Lucioles ; F-06921 Sophia-Antipolis Cedex ; France, vol. RAN WGI, No. Korea; Oct. 30, 2007, XP050108271.
NTT Docomo et al: "Views on Frequency 35-50 Hopping Method for SRS", 3GPP Draft; RI-081952 SRS Hopping, 3rd Generation Partnership Project (3GPP), Mobile Competence Centre ; 650, Route Des Lucioles ; F-06921 Sophia-Antipolis Cedex ; France, vol. RAN WGI, No. Kansas City, USA; May 14, 2008, XP050110304, [retrieved on May 14, 2008].
Pantech&Curitel: "Further consideration 21-34 on enhanced SRS for CoMP/non-CoMP user group", 3GPP Draft; RI-095087, 3rd Generation Partnership Project (3GPP), Mobile Competence Centre; 650, Route Des Lucioles; F-06921 Sophia-Antipolis Cedex; France, No. Jeju; Nov. 9, 2009, XP050389421.
Qualcomm Europe: "SRS Enhancements for LTE-A", 3GPP Draft; RI-094871 SRS Enhancements for LTE-A, 3rd Generation Partnership Project (3GPP), Mobile Competence Centre ; 650, Route Des Lucioles ; F-06921 Sophia-Antipolis Cedex ; France, No. Jeju; Nov. 9, 2009, Nov. 1, 2009, XP050389249.
Samsung: "SRS Transmission in LTE-A", 3GPP Draft; RI-094576 LTE-A SRS, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050388990, [retrieved on Nov. 3, 2009].
650, Route Des Lucioles; F-06921 Sophia-Antipolis Cedex; France No. Jeju; 20091109, Nov. 9, 2009, XP050388990, [retrieved on Nov. 3, 2009].
CATT: "Considerations on Enhanced SRS Transmission Scheme", 3GPP Draft; R1-094554, 3rd Generation Partnership Project (3GPP), Mobile Competence Centre; 650, Route Des Lucioles; F-06921 Sophia-Antipolis Cedex; France, No. Jeju; Nov. 9, 2009, XP050388969, [retrieved on Nov. 2, 2009].
Taiwan Search Report—TW099142216—TIPO—Jul. 11, 2013.
Taiwan Search Report—TW099142216—TIPO—May 6, 2014.
Taiwan Search Report—TW103132887—TIPO—Jan. 26, 2016.

* cited by examiner

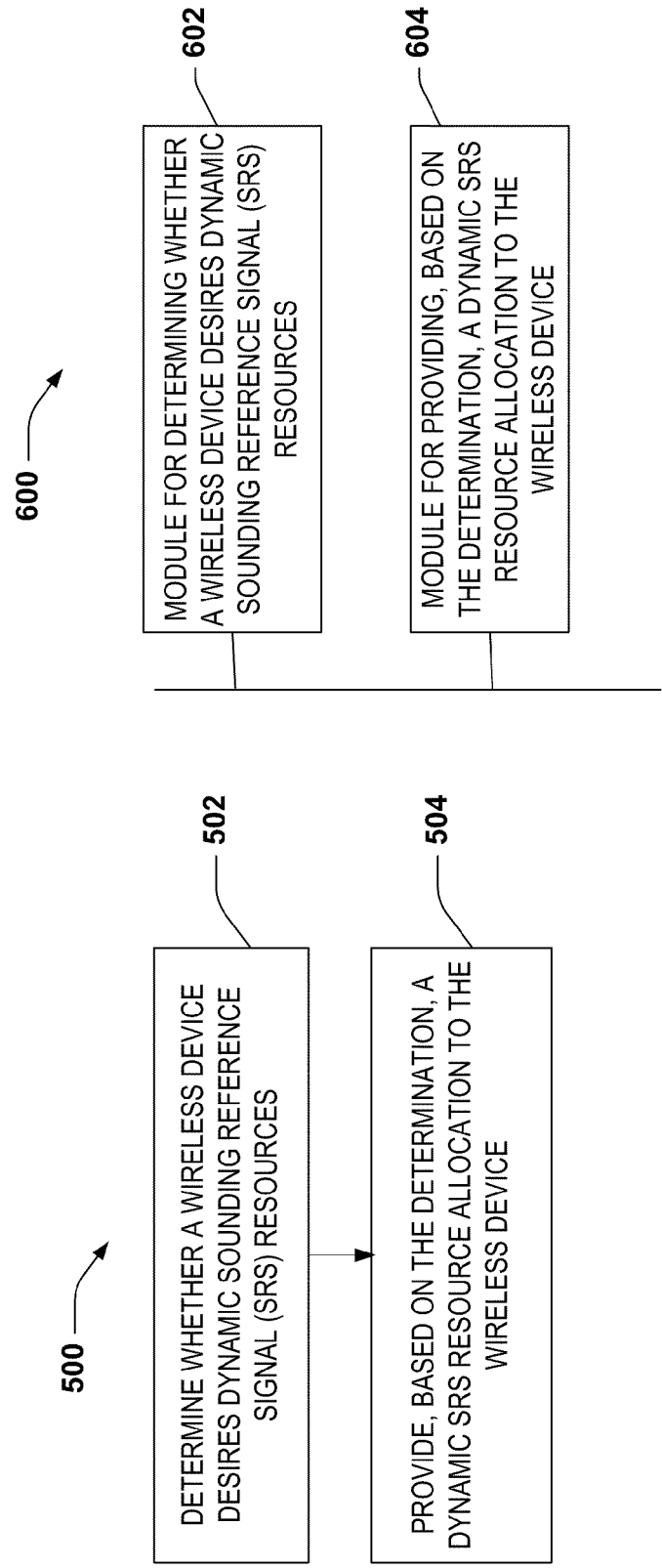

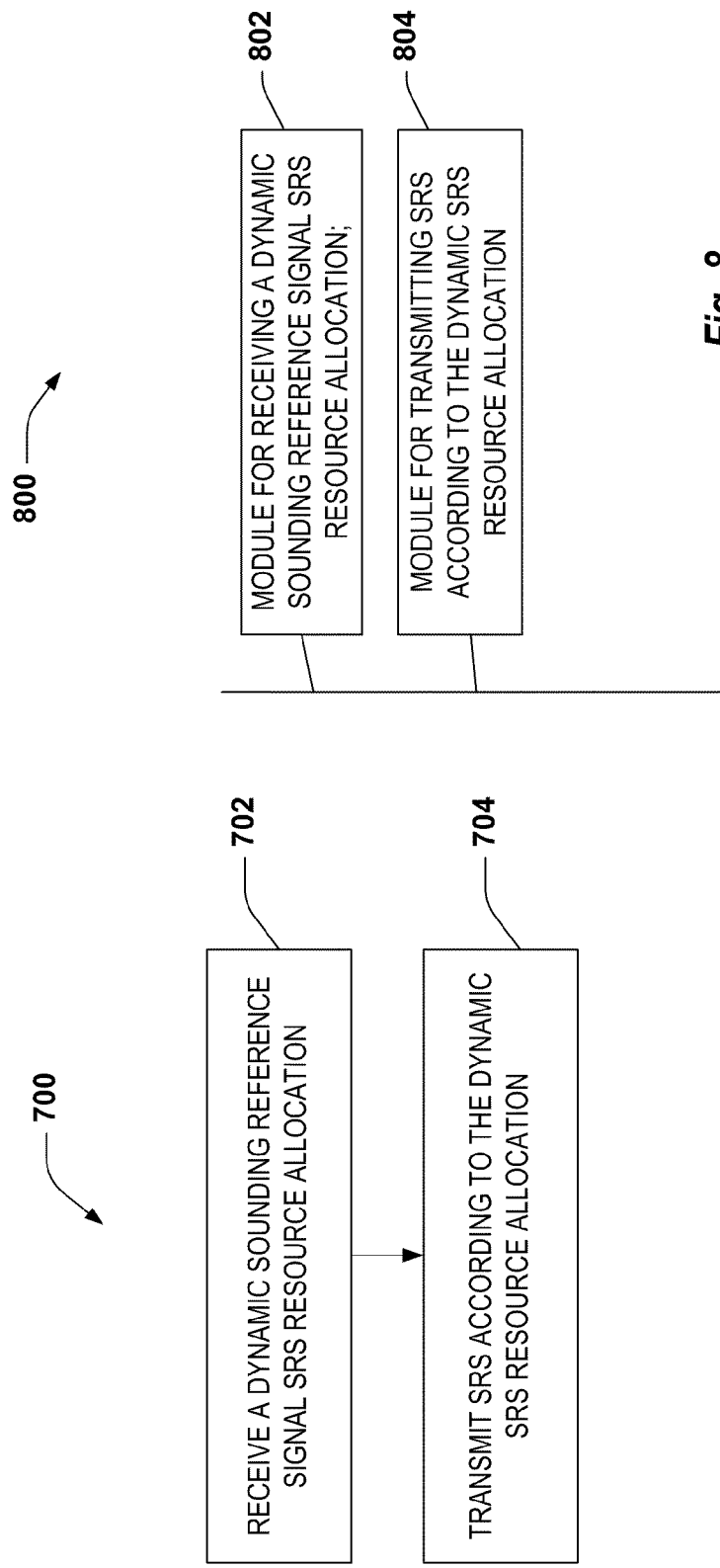

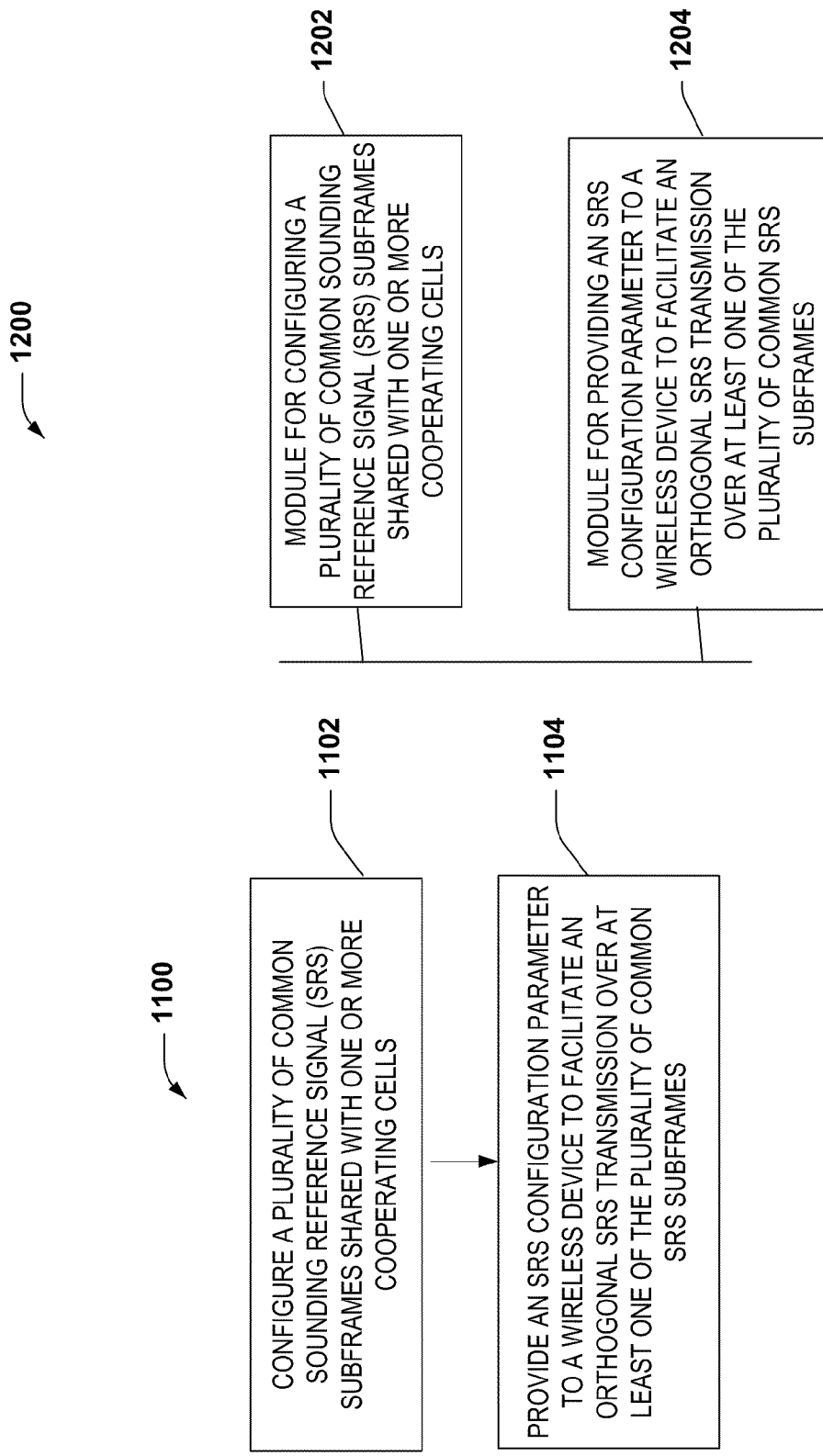

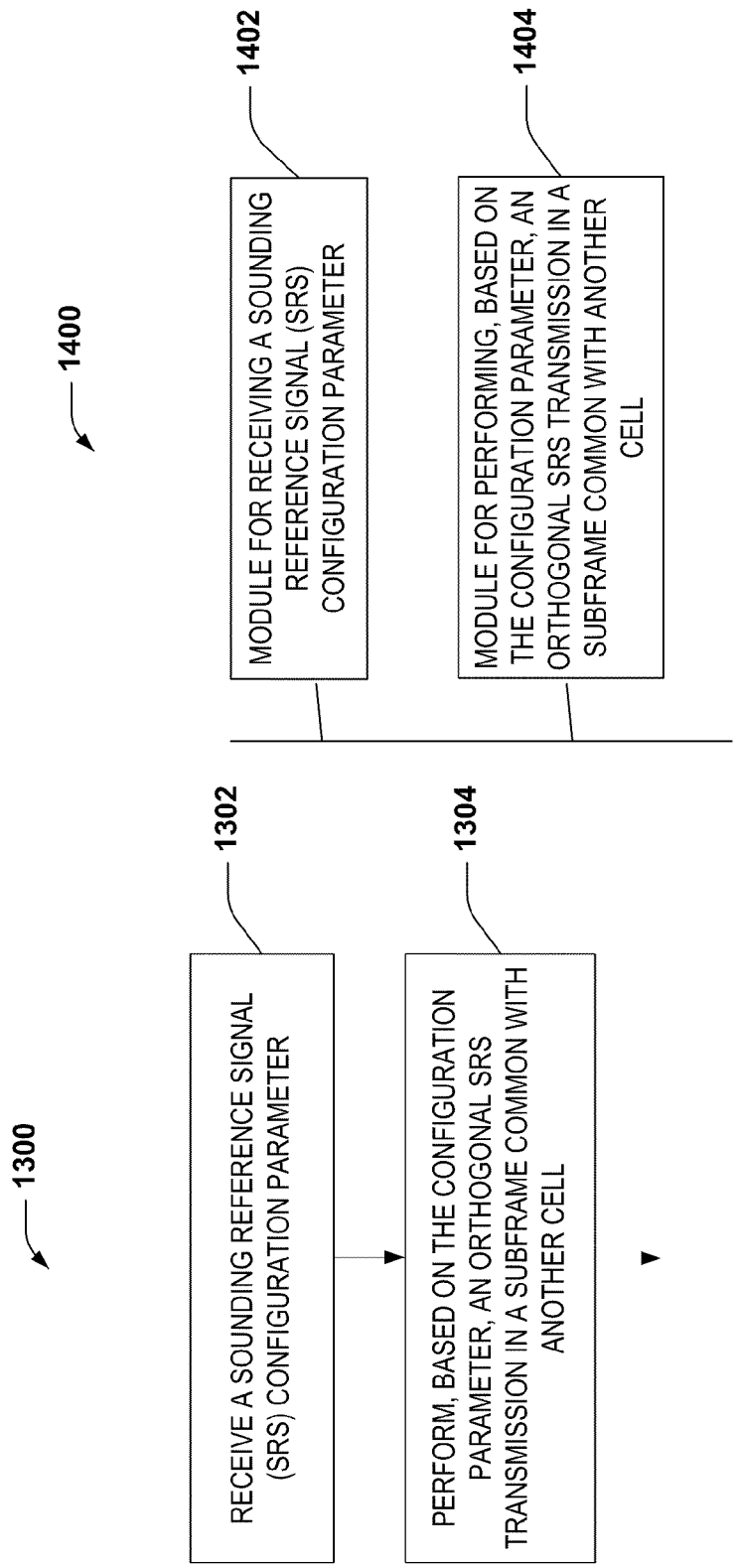

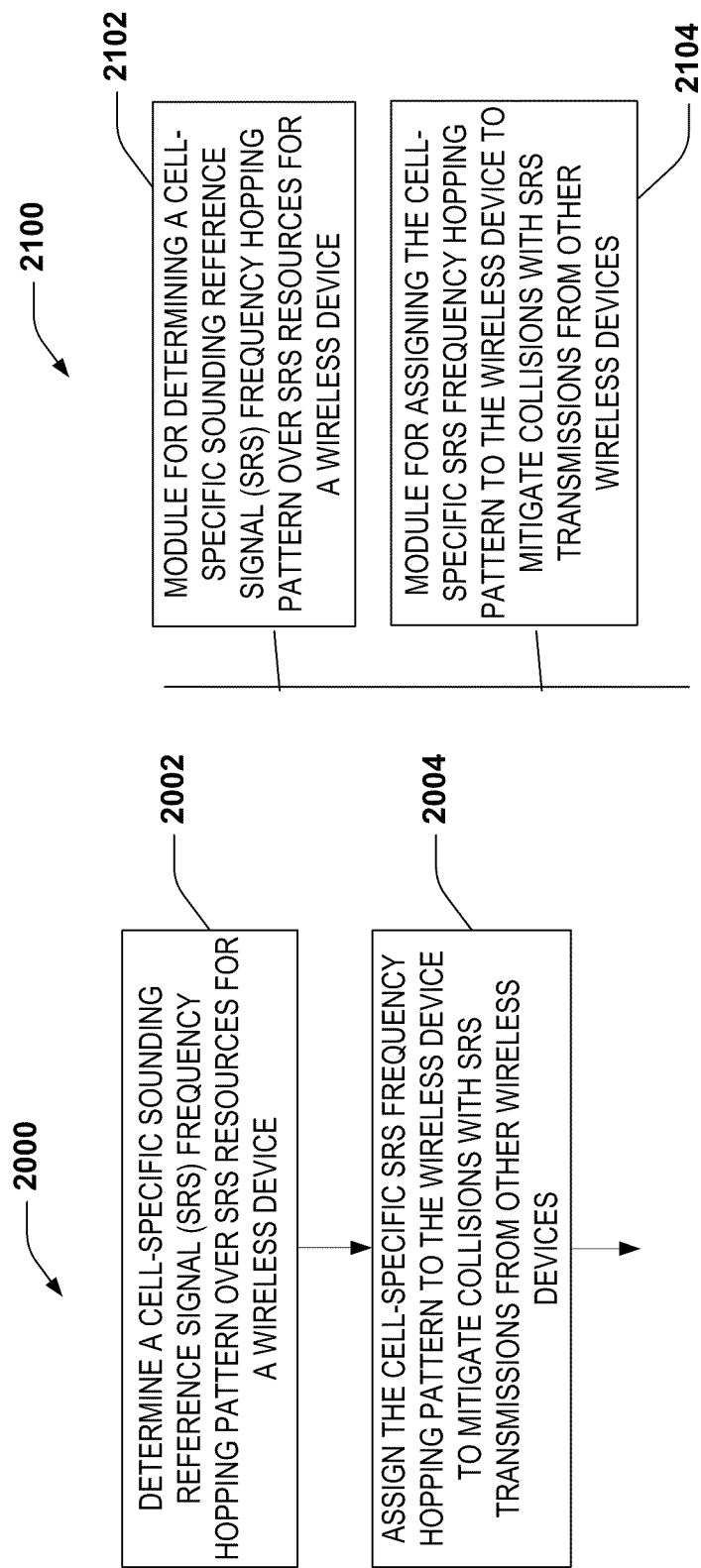

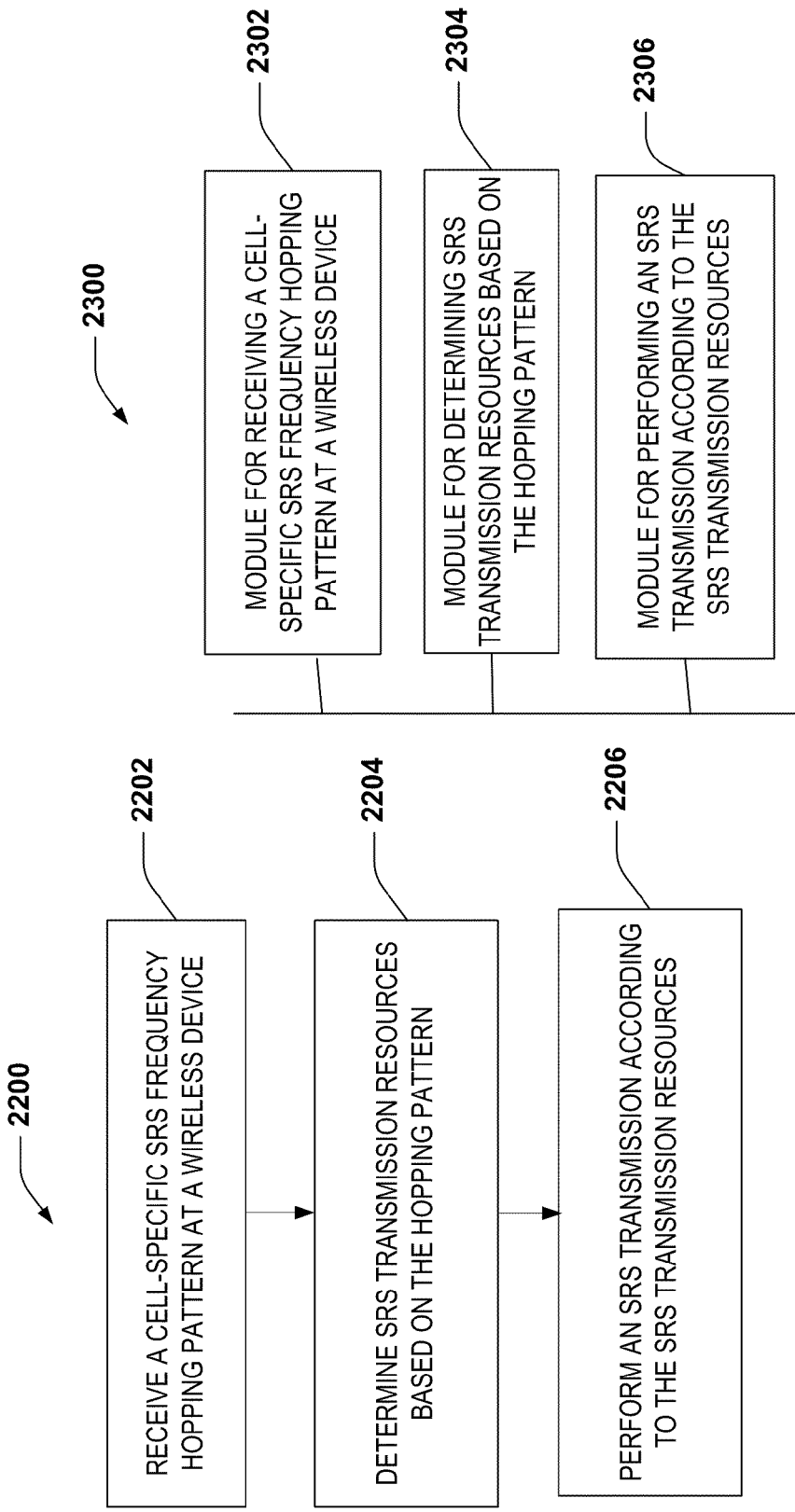

SOUNDING REFERENCE SIGNAL ENHANCEMENTS FOR WIRELESS COMMUNICATION

CROSS-REFERENCE TO RELATED APPLICATIONS

This application claims the benefit of U.S. Provisional Patent Application Ser. No. 61/266,456 entitled "SOUNDING REFERENCE SIGNAL ENHANCEMENTS FOR LTE-ADVANCED" filed Dec. 3, 2009, which is herein incorporated by reference in its entirety.

BACKGROUND

I. Field of the Invention

The following description relates generally to wireless communications, and more particularly to providing resource elements for transmission of a reference signal over a channel.

II. Relevant Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and the reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In addition, mobile terminals can transmit sounding reference signals (SRS) to base stations, which can be utilized, for example, to calculate the uplink channel quality. Base stations can utilize the SRSs in allocating uplink resources to the transmitting mobile terminal. In LTE Release 8 (Rel-8), certain parameters for transmitting SRSs, such as a maximum transmission bandwidth, available subframes, etc. related to a specific cell, can be defined during operation of a wireless network. Furthermore, mobile terminal specific parameters, such as a configuration index of the SRS period and subframe offset for a particular mobile terminal, bandwidth for the terminal, starting resource block, frequency hopping bandwidth, transmission comb, SRS transmission duration, cyclic shift for generating the reference sequence, and/or the like can also be defined at the run time. Mobile terminals in Rel-8 can transmit SRSs as specified by these parameters. LTE-Advanced (LTE-A) mobile terminals can support more advanced technologies and features that can benefit from enhancements to SRS configuration.

There is a need to provide advanced framework for the use of sounding reference signals in LTE-A networks.

SUMMARY

The systems and methods provided in this disclosure meet the above discussed needs, and others. Briefly and in general terms, the disclosed designs provide methods and apparatuses for providing enhanced capabilities for transmission and allocation of SRS resources.

The following presents a simplified summary of one or more embodiments in order to provide a basic understanding of such techniques and embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one exemplary aspect, a wireless communication method includes determining whether a wireless device desires dynamic sounding reference signal (SRS) resources and providing, based on the determination, a dynamic SRS resource allocation to the wireless device.

In another exemplary aspect, a wireless communications apparatus, comprising a memory configured to store instructions determine whether a wireless device desires dynamic SRS resources and provide, based on the determination, a dynamic SRS resource allocation to the wireless device and a processor configured to execute the instructions from the memory are disclosed.

In yet another exemplary aspect, an apparatus for wireless communication comprises means for determining whether a wireless device desires dynamic sounding reference signal (SRS) resources and means for providing, based on the determination, a dynamic SRS resource allocation to the wireless device.

In yet another exemplary aspect, a computer product comprising a tangible computer-readable medium comprising code for causing at least one computer to determine whether a wireless device desires dynamic sounding reference signal SRS resources and code for causing the at least one computer to provide, based on the determination, a dynamic SRS resource allocation to the wireless device is disclosed.

In yet another exemplary aspect, a method for wireless communication implemented on a wireless device comprises receiving a dynamic sounding reference signal SRS resource allocation and transmitting SRS according to the dynamic SRS resource allocation.

In yet another exemplary embodiment, a wireless communication apparatus comprises a memory configured to store instructions to receive a dynamic sounding reference signal SRS resource allocation and transmit SRS according to the dynamic SRS resource allocation and a processor configured to execute the instructions from the memory is disclosed.

In yet another exemplary embodiment, a wireless communication apparatus comprises means for receiving a dynamic sounding reference signal SRS resource allocation and means for transmitting SRS according to the dynamic SRS resource allocation.

In yet another exemplary embodiment, a computer program product comprises a tangible computer-readable medium comprising code for causing at least one computer to receive a dynamic sounding reference signal SRS resource allocation and code for causing the at least one computer to transmit SRS according to the dynamic SRS resource allocation is disclosed.

In yet another exemplary embodiment, a method for wireless communication comprises configuring a plurality of common sounding reference signal (SRS) subframes shared with one or more cooperating cells and providing an SRS configuration parameter to a wireless device to facilitate an orthogonal SRS transmission over at least one of the plurality of common SRS subframes.

In yet another exemplary embodiment, a wireless communication apparatus comprises a memory storing instructions to configure a plurality of common sounding reference signal (SRS) subframes along with one or more cooperating cells and provide an SRS configuration parameter to a wireless device to facilitate orthogonal SRS transmission over at least one of the plurality of common SRS subframes, and a processor configured to execute the instructions from the memory are disclosed.

In yet another exemplary aspect, a wireless communication apparatus comprising means for configuring a plurality of common sounding reference signal (SRS) subframes shared with one or more cooperating cells and means for providing an SRS configuration parameter to a wireless device to facilitate an orthogonal SRS transmission over at least one of the plurality of common SRS subframes is disclosed.

In yet another exemplary aspect, a computer program product comprising a tangible computer-readable medium comprising code for causing at least one computer to configure a plurality of common sounding reference signal (SRS) subframes along with one or more cooperating cells and code for causing the at least one computer to provide an SRS configuration parameter to a wireless device to facilitate orthogonal SRS transmission over at least one of the plurality of common SRS subframes is disclosed.

In yet another exemplary aspect, a method of reference signal transmission in a cellular wireless network comprises receiving a sounding reference signal (SRS) configuration parameter and performing, based on the SRS configuration parameter, an SRS transmission.

In yet another exemplary aspect, a wireless communication apparatus comprises means for receiving a sounding reference signal (SRS) configuration parameter and means for performing, based on the SRS configuration parameter, an SRS transmission.

In yet another exemplary aspect, a computer program product comprising a tangible computer-readable medium comprising code for receiving a sounding reference signal (SRS) configuration parameter and code for performing, based on the SRS configuration parameter, an SRS transmission is disclosed.

In yet another exemplary aspect, a wireless communication method comprises determining a cell-specific SRS frequency hopping pattern over SRS resources for a wireless device and assigning the cell-specific SRS frequency hopping pattern to the wireless device to mitigate collisions with SRS transmissions from other wireless devices.

In yet another exemplary aspect, a wireless communication apparatus comprising a memory for storing instructions to determine a cell-specific sounding reference signal (SRS) frequency hopping pattern over SRS resources for a wireless device and assign the cell-specific SRS frequency hopping pattern to the wireless device to mitigate SRS collision with a disparate wireless device, and a processor for executing the instructions from the memory are disclosed.

In yet another exemplary aspect, an apparatus comprises means for determining a cell-specific sounding reference signal (SRS) frequency hopping pattern over SRS resources for a wireless device and means for assigning the cell-specific SRS frequency hopping pattern to the wireless device to mitigate SRS collision with a disparate wireless device.

In yet another exemplary aspect, a computer program product comprising a tangible computer-readable medium comprising code for causing at least one computer to determine a cell-specific sounding reference signal (SRS) frequency hopping pattern over SRS resources for a wireless device and code for causing the at least one computer to assign the cell-specific SRS frequency hopping pattern to the wireless device to mitigate SRS collision with a disparate wireless device is disclosed.

In yet another exemplary aspect, a wireless communication method comprises receiving a cell-specific sounding reference signal (SRS) frequency hopping pattern at a wireless device, determining SRS transmission resources based on the received hopping pattern and performing an SRS transmission according to the determined SRS transmission resources.

In yet another exemplary aspect, a wireless communication apparatus comprises a memory for storing instructions to receive a cell-specific sounding reference signal (SRS) frequency hopping pattern at a wireless device, determine SRS transmission resources based on the received hopping pattern and perform an SRS transmission according to the determined SRS transmission resources, and a processor to execute the instructions from the memory are disclosed.

In yet another exemplary aspect, an apparatus comprises means for receiving a cell-specific sounding reference signal (SRS) frequency hopping pattern at a wireless device, means for determining SRS transmission resources based on the received hopping pattern and means for performing an SRS transmission according to the determined SRS transmission resources.

In yet another exemplary aspect, a computer program product comprising a tangible computer readable medium comprising code for causing at least one computer to receive a cell-specific sounding reference signal (SRS) frequency hopping pattern at a wireless device, code for causing the at least one computer to determine SRS transmission resources based on the received hopping pattern and code for causing the at least one computer to perform an SRS transmission according to the determined SRS transmission resources is disclosed.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 5 illustrates a flow chart representation of a process of wireless communication.

FIG. 6 illustrates a block diagram representation of a portion of a wireless communication apparatus.

FIG. 7 illustrates a flow chart representation of a process of wireless communication.

FIG. 8 illustrates a block diagram representation of a portion of a wireless communication apparatus.

FIG. 11 illustrates a flow chart representation of a process of wireless communication.

FIG. 12 illustrates a block diagram representation of a portion of a wireless communication apparatus.

FIG. 13 illustrates a flow chart representation of a process of wireless communication.

FIG. 14 illustrates a block diagram representation of a portion of a wireless communication apparatus.

FIG. 20 illustrates a flow chart representation of a process of wireless communication.

FIG. 21 illustrates a block diagram representation of a portion of a wireless communication apparatus FIG. 22 illustrates a flow chart representation of a process of wireless communication.

FIG. 23 illustrates a block diagram representation of a portion of a wireless communication apparatus.

DESCRIPTION

Figure 1:
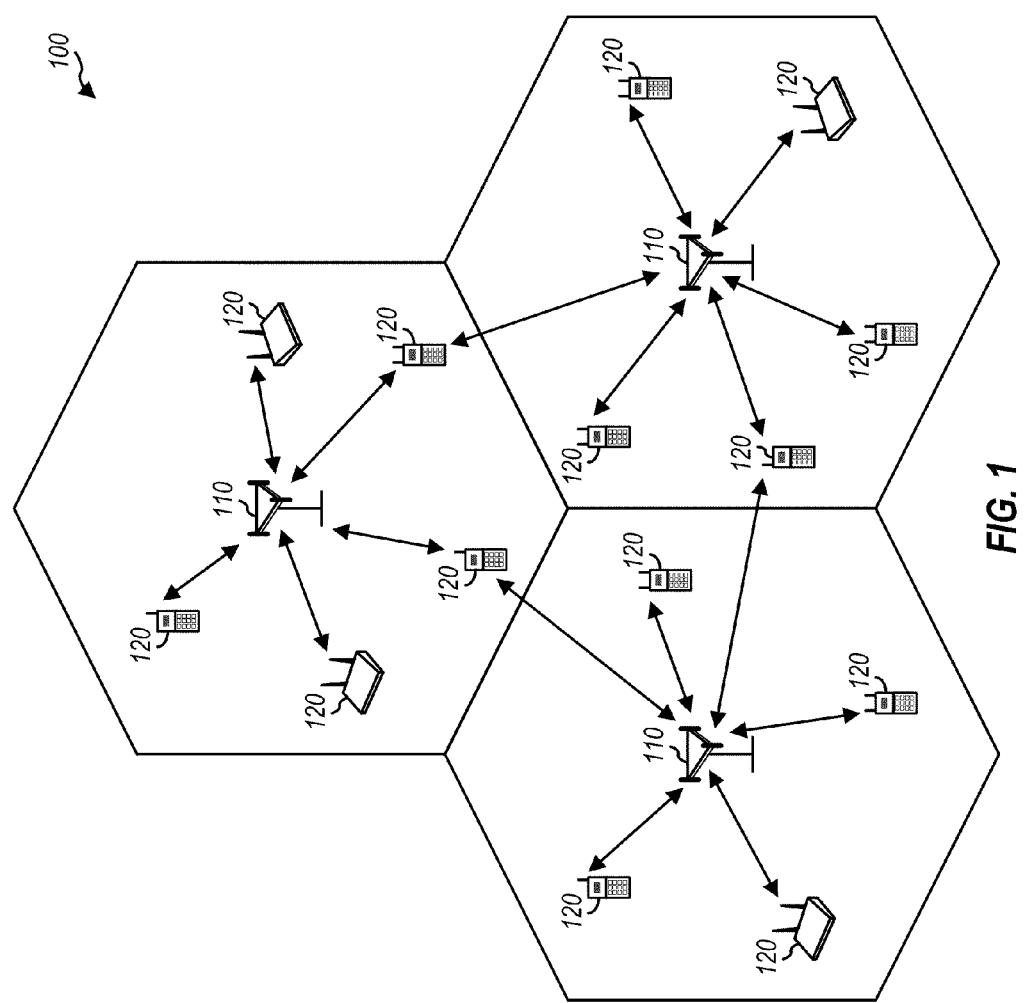
FIG. 1 illustrates a multiple access wireless communication system according to one embodiment.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Sounding Reference Signals (SRS) are used in LTE Release 8 or Release 9 (Rel-8/9) and LTE-Advanced (LTE-A) to help improve performance of wireless communication. SRS are signals known at the base station and are transmitted by each mobile terminal using time/frequency transmission resources specified by the base station. A base station may analyze the received SRS transmissions to improve communication with the mobile terminal. Several techniques of analyzing SRS and improve signal transmissions on the downlink are well known and are not discussed here for brevity. Because SRS received from a mobile terminal are used to characterize the channel to/from the mobile terminal, ideally, the received SRS should be free from interference from transmissions by other mobile terminals in the network (same cell or a neighboring cell). Furthermore, operational conditions, such as movement of the mobile terminal, may cause the channel to vary in time. Therefore, re-measuring the channel to overcome transmission setbacks due to such channel changes, may help improve short term channel transmission performance during such channel changes.

Briefly and in general terms, dynamic SRS resource allocation techniques are disclosed. In one aspect, dynamic SRS resource allocation allows quick sounding of a channel, which may be helpful in responding to instantaneous variations in channel conditions. In another aspect, using dynamic SRS resources, base stations may be able to address occasional needs to re-characterize channels by "sounding" channels between to previously regularly scheduled (semi-statically configured as in LTE Rel-8/9) SRS transmission instances. The term "sounding" refers to transmitting a reference signal over the transmission channel. In one aspect, a dynamic SRS resource allocation scheme may be used in lieu of a semi-static SRS resource allocation scheme. In some designs, a pool of transmission resources may be reserved for dynamic SRS transmissions and the pool of resources may be made known to the mobile terminals. When needed, a mobile terminal may be instructed to use particular transmission resources from the reserved pool for dynamic SRS transmissions. In this way, interference with semi-static and/or SRS transmissions from other mobile terminals may be avoided.

Briefly and in general terms, techniques are provided for inter-cell orthogonalization of SRS transmissions. Possible designs for orthogonalization of SRS transmissions from mobile terminals transmitting in cooperating cells include orthogonalizing in the frequency domain, the time domain and/or a code domain. In one aspect, base stations of cooperating cells may coordinate SRS resource allocations to facilitate inter-cell orthogonalization of SRS transmissions.

Briefly and in general terms, techniques are disclosed to facilitate randomized SRS hopping patterns in different cells. In one aspect, randomizing SRS hopping patterns may reduce or eliminate collisions among SRS transmissions of different cells. In some designs, such a randomization is achieved by simply extending some SRS allocation formulae used in Rel-8.

The above, and other, aspects are disclosed in greater detail below.

FIG. 1 shows a wireless communication system 100, which may be an LTE system or some other system. System 100 may include a number of evolved Node Bs (eNBs) 110 and other network entities. An eNB 110 may be an entity that communicates with the UEs and may also be referred to as a base station, a Node B, an access point, etc. Each eNB 110 may provide communication coverage for a particular geographic area and may support communication for the UEs located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

UEs 120 may be dispersed throughout the system, and each UE 120 may be stationary or mobile. The UE 120 may also be referred to as a mobile station, a terminal, an access terminal, a subscriber unit, a station, etc. The UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

LTE utilizes orthogonal frequency division multiplexing (OFDM) on the downlink and single-carrier frequency division multiplexing (SC-FDM) on the uplink. OFDM and SC-FDM partition a frequency range into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 mega-Hertz (MHz), respectively. The system bandwidth may correspond to a subset of the K total subcarriers.

Figure 2:
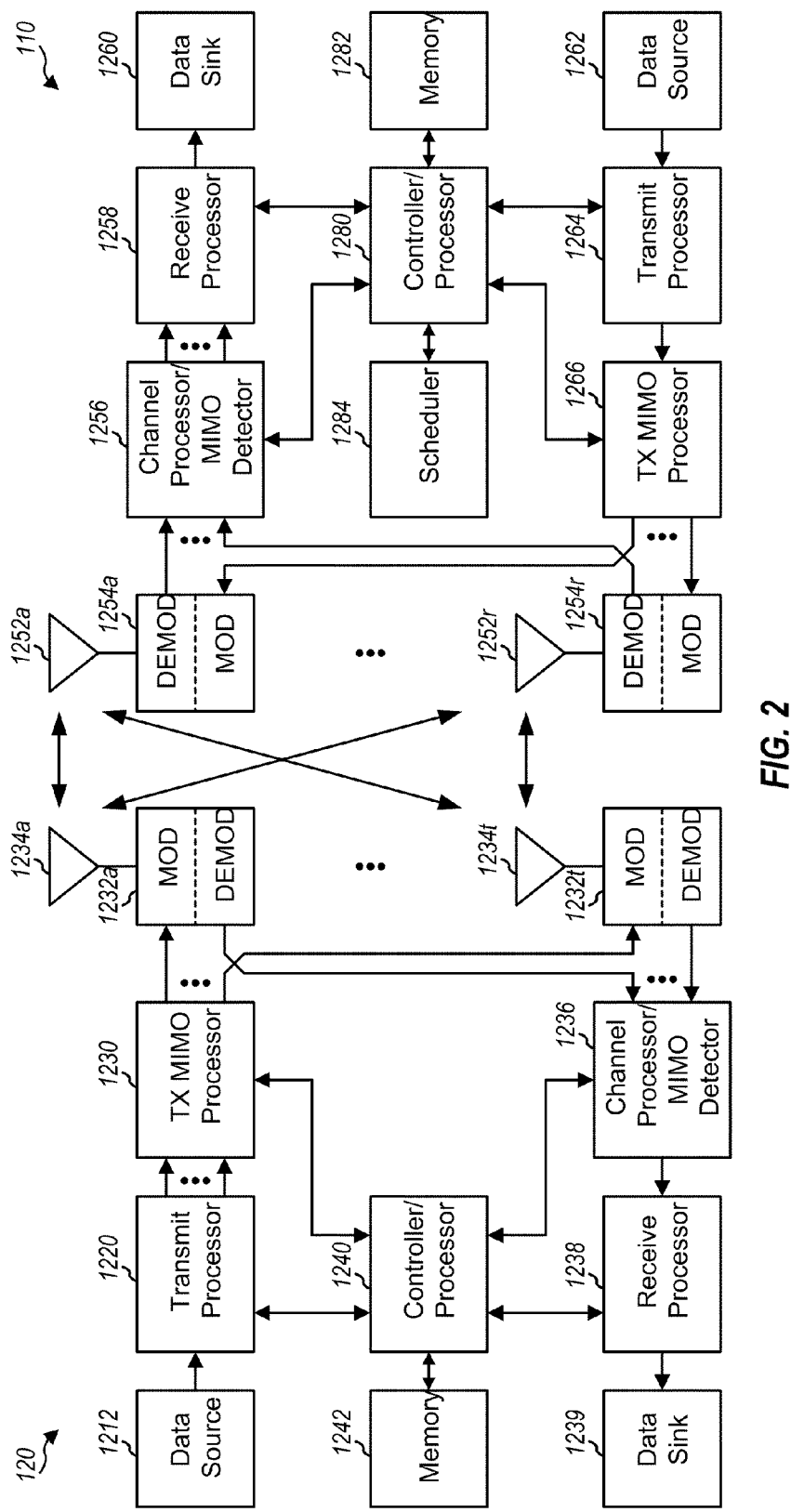
FIG. 2 illustrates a block diagram of a communication system.

FIG. 2 shows a block diagram of a design of an exemplary base station/eNB 110 and a UE 120, which may be one of the eNBs and one of the UEs in FIG. 1. The UE 120 may be equipped with T antennas 1234a through 1234t, and base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 1400 in FIG. 14 and/or other processes for the techniques described herein. Processor 1256, processor 1280, and/or other processors and modules at base station 110 may perform or direct process 1202 in FIG. 12 and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

In conventional wireless communication systems, such as Rel-8/9 systems, SRS may be semi-statically configured by upper layers (e.g., at a layer above layer 3 in the Open System Interconnection, or OSI, protocol stack). Semi-statically configured periodic SRS transmissions typically have a response time of several hundreds of milliseconds (e.g., 100 to 1000 millisecond or more) and therefore may be slow in responding to certain fast occurring instantaneous channel changes. In certain designs, a higher layer component at a base station may configure SRS via SRS configuration parameters that are cell-specific. For example, in Rel-8, the cell-specific SRS configuration parameters include srs-BandwidthConfig ($C_{SRS}$) which indicates the maximum SRS transmission bandwidth and srsSubframe-Configuration, specified by parameters $T_{SFC}$ and $\Delta_{SFC}$, which define the available subframes for SRS transmissions.

In conventional wireless communication systems, such as Rel-8/9, UE-specific SRS configuration parameters include SRS configuration index $I_{SRS}$, SRS period for a particular UE 120 ($T_{SRS}$) and SRS subframe offset for the particular UE 120 ($T_{offset}$). Furthermore, SRS bandwidth for a particular UE 120 is specified by the parameter $B_{SRS}$. The parameter $n_{RRC}$ indicates the starting physical resource block (PRB) and $b_{hop}$ represents frequency hopping bandwidth. Furthermore, the operational duration of SRS transmission (e.g., whether to transmit once or periodically transmit until disabled) and the cyclic shift for generating a reference sequence for allocation of SRS resources and a transmission comb patter may all be specified via higher layers.

Figure 3:
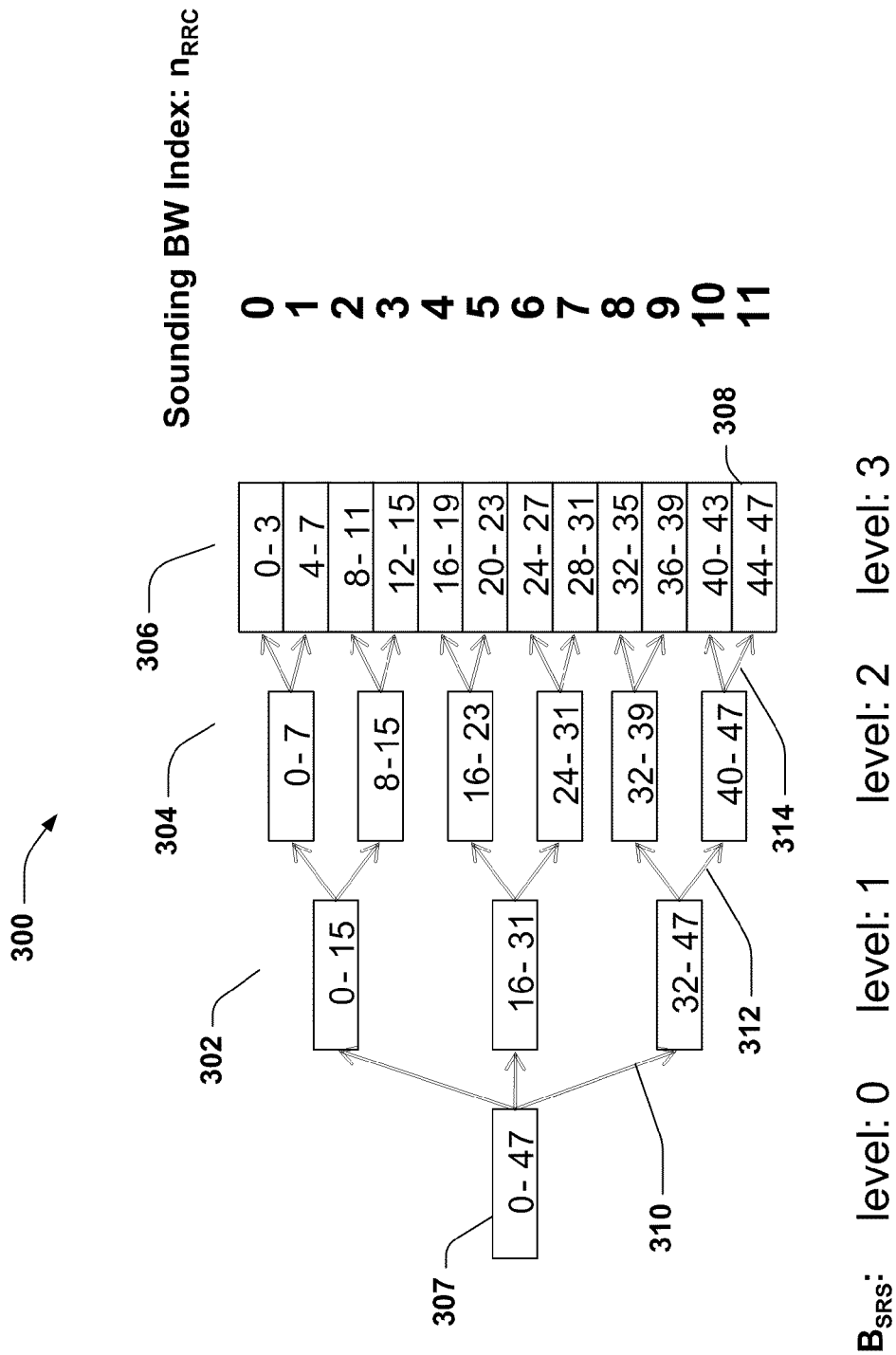
FIG. 3 illustrates a block diagram showing an example multi-level tree structure illustrating assignment of sounding reference signal (SRS) resources.

FIG. 3 shows an example tree structure 300 for assignment of resource to SRS transmissions. The illustrated tree structure 300 may have four levels, level 0 to level 3. For each given SRS transmission instance, the RB allocated to that SRS transmission may be specified by a combination of parameters ($b_0$, $b_1$, $b_2$), which specifies how to traverse the tree structure to find the actual RB allocations. For example, from a given total bandwidth of 48 RBs available for SRS transmissions, as indicated by group 307 at level 0, actual resource assignment for SRS transmission may be the four RB group 308, at level 3, represented by values $b_0=2$, $b_1=1$ and $b_2=1$. In general, $b_0$ may take one of three different values, 0, 1 and 2, indicating which of the three RB groups of column 302 covers the resource block to be assigned. Similarly, $b_1$ may take two different values, 0 and 1, indicating whether to select the upper group or the lower group in column 304, for a given selection in column 302. Similarly, $b_2$ may take one of two values 0 and 1, indicating whether to select the upper RB group or the lower RB group in column 306, corresponding to each selected group of RBs in column 304. In the description below, further use of the tree structure 300 for SRS resource allocation is described.

With the increased demand on uplink bandwidth, it may be desirable to increase the peak spectral efficiency in the uplink (UL) direction. In some designs, closed-loop precoding may be performed for improved bits per Hertz performance in the UL. In closed-loop designs, the eNB 110 may inform the UE 120 the desired precoding vector to be used for UL transmissions.

For the eNB 110 to be able to accurately calculate the desired precoding vector, the eNB 110 may need SRS transmissions to be sent from UEs 120 to the eNB 110. If the UE 120 has a single power amplifier (PA) and a single transmit antenna, then every periodic SRS transmission opportunity available in Rel-8/9 may be dedicated to the single transmit antenna. However, when the UE 120 has multiple antennas (e.g., 2 transmit antennas) and or multiple PA stages, allocating SRS transmission opportunities in the conventional way may result in (1) either reduced SRS multiplexing capability, e.g., when different SRS resources are allocated to different transmit antennas of the same UE 120, or (2) the sounding period (i.e., the repetitiveness of transmission of SRS from a given antenna) may be increased so that each transmit antenna of a UE 120 can be sounded alternately.

Furthermore, in situations where the uplink traffic is bursty, then it may be wasteful for all UEs 120 to send SRS from all transmit antennas frequently and periodically. Instead, in certain disclosed designs, SRS bandwidth is dynamically allocated to UEs 120 that are transmitting UL data traffic. Also, in certain designs, certain UEs 120, may be allocated more SRS transmission opportunities to benefit from closed loop precoding. The UEs 120 may be, for example, UEs 120 transmitting UL data and/or UEs 120 with larger error rates than other UEs 120. In certain designs, as further explained below, dynamic SRS resource allocation, instead of a semi-static resource configuration as in Rel-8/9, is performed to better deal with traffic bursts and changing channel conditions.

Figure 4:
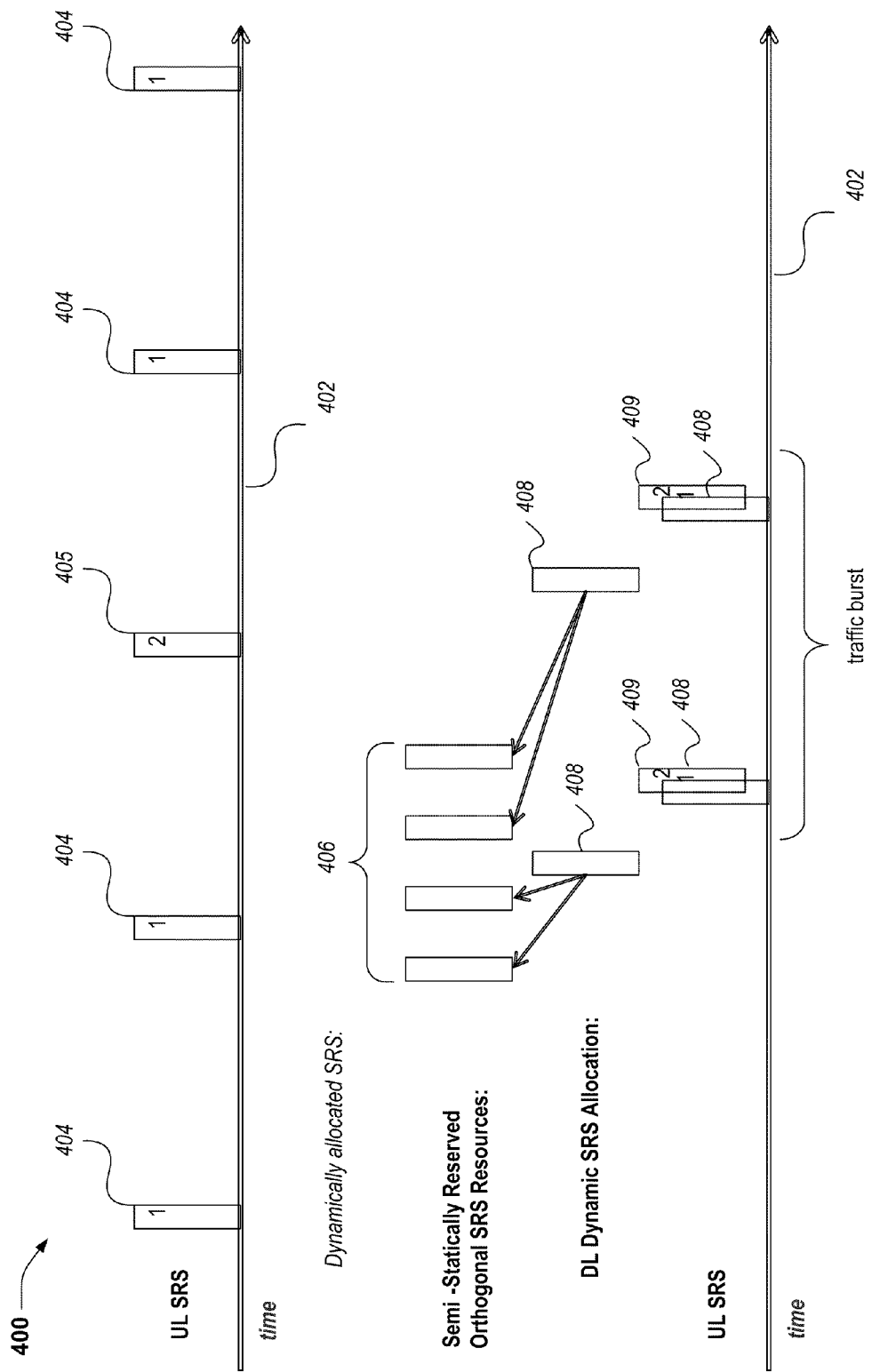
FIG. 4 illustrates timing relationship between semi-statistically and dynamically allocated SRS resources.

FIG. 4 depicts an example SRS resource allocation timeline. As shown in chart 400, in some designs, periodic SRS resources may be allocated over time (horizontal axis 402) for UL transmission of SRS at generally uniform separation, as in Rel-8/9. In chart 400, SRS transmission instances 404 are allocated to a first transmit antenna of the UE 120 and SRS transmission instances 405 are allocated to a second transmit antenna of the UE 120. In some designs, in addition to these semi-statically allocated periodic resources 404, 405, the eNB 110 may set aside a set of orthogonal resources (depicted as group 406) for the UE 120, semi-statically according to higher layer signaling. In some designs, this set of orthogonal SRS resources configured by higher layers may be known to the UEs 120. In some designs, a message field (e.g., one or two bit long) may be included in a downlink grant message to a UE 120, to indicate which SRS resources from this set of resources are dynamically allocated to the UE 120. In some designs, the field used for downlink dynamic SRS resource allocation may re-purpose some of the bits in a message (e.g., as used in Release 8), indicating resource grants to a particular UE 120.

When the eNB 110 determines that additional SRS transmissions are needed (e.g., based on observed data traffic conditions), the eNB 110 may use one or more of the semi-statically reserved orthogonal resources 406 and indicate the assignment of the SRS transmission resources in DL SRS message allocations 408. Upon receiving the SRS allocations 408, the first and the second transmission antenna of the UE 120 may transmit SRS in the uplink direction, as depicted by transmission instances 408 (for the first transmission antenna of the UE 120) and 409 (for the second transmission antenna of the UE 120) along the time line 402. It may therefore be seen that from a UE's perspective, SRS transmissions include semi-statically configured periodic SRS transmissions (404, 405) and dynamic SRS transmissions (408, 409). In some designs, the eNB 110 may schedule no semi-statically configured periodic SRS transmissions and may only use dynamic SRS allocations to meet the need to use sounding reference signals.

In some designs, the signaling of dynamic SRS resource allocation may therefore be UE-specific, possibly re-using some bits in a message scheduled to be sent to the UE 120 (e.g., a DL/UL Scheduling grant message). In some designs, the allocated resources may be valid only for a particular subframe following the schedule grant. In some designs, the particular subframe may be a predetermined time away from the subframe in which the scheduling grant is transmitted (e.g., dynamic SRS is transmitted in subframe t+4, where t is the subframe index of scheduling grant transmission).

In some designs, dynamic SRS resources may be allocated to a group of UEs 120. In some designs, the physical downlink control channel (PDCCH) may be used to carry the group dynamic resource assignment. In some designs, a message for the allocation may be similar to that used in group transmit power control assignment for Rel-8. In some designs, the group dynamic SRS resource allocation may be valid for a single subframe after the group dynamic SRS resource allocation is transmitted.

In some designs, the eNB 110 may semi-persistently allocate or de-allocate SRS resources to/from one or more UEs 120. The SRS resources may be "semi-persistent" in the sense that once allocated, the allocation may be considered valid and in effect, until explicitly de-allocated by a subsequent message from the eNB 110. In some designs, one or more bits may be used to indicate the allocation/de-allocation and/or identify the group of dynamic resources being semi-persistently assigned.

In some designs, the UE 120 may use a regular scheduling request for requesting SRS transmission bandwidth. In some cases, e.g., when the UE 120 is expecting increased uplink data traffic, the UE 120 may use a specific uplink message for requesting SRS transmissions. In some design, the eNB 110 may initiate SRS transmission resource allocation by monitoring buffer fullness of transmission buffers allocated to a particular UE 120. In some designs, the eNB 110 may monitor channel conditions, such as error rates and signal to noise ratio (SNR), to monitor whether additional SRS resource allocations to a particular UE 120 need to be assigned.

FIG. 5 is a flow chart depicting a process 500 for wireless communication. At block 502, a determination is made about whether a wireless device desires a dynamic sounding reference signal (SRS) resources. In some designs, the operation of making the determination includes receiving a request for dynamic SRS allocation from a UE. In some designs, the determination includes estimating an operational parameter for the communication channel between the eNB and a UE for which the determination is made. As discussed above, the operational parameter may include one or more of a data traffic activity and an error rate for the communication channel.

In some designs, a UE 120 may make a determination about whether dynamic SRS resources are needed and transmit a request to the eNB 110, based on the determination, for dynamic SRS resources. In some designs, the request may be transmitted in a regularly scheduled request transmission.

At block 504, based on the determination, a dynamic SRS resource allocation is provided to the wireless device. In some designs, the providing operation includes signaling the dynamic SRS resource allocation in a portion of an uplink or downlink scheduling grant. In some designs, the providing operation includes signaling the dynamic SRS resource allocation along with a group of dynamic SRS resource allocations over a physical downlink control channel (PDCCH).

In certain designs, the process 500 further includes allocating semi-persistent SRS resources to the wireless device. In certain designs, the process 500 further includes semi-statically reserving a resource set for dynamic SRS allocation. The semi-static reservation of the set of orthogonal SRS resources for dynamic allocation may be configured by higher layers. In some designs, one SRS resource is characterized by time, frequency and/or code (e.g., cyclic shift) assigned to the resource. Therefore, orthogonal SRS resources could be orthogonal in time, frequency and/or code domain (e.g., by having a different cyclic shift).

According to an example, the eNB 110 can allocate a minimum set of semi-statically configured resources to the UE for transmitting the periodic SRSs. This can be similar to allocation in Rel-8/9. In addition, however, SRS resource determining component can decide whether additional dynamic SRS resources are needed for wireless device (e.g., to support closed-loop precoding in LTE-A or other functions that facilitate SU-MIMO operation, etc.). In one example, this can be based on an explicit request for additional SRS resources generated as described above.

FIG. 6 is a block diagram representation of a portion of a wireless device 600 comprising module 602 for determining whether a wireless device desires dynamic sounding reference signal (SRS) resources and module 604 for providing, based on the determination, a dynamic SRS resource allocation to the wireless device. The wireless device 600 and modules 602 and 604 may implement other techniques of dynamic resource allocation, discussed herein.

FIG. 7 shows a flow chart of a process 700 of wireless communication, for example, performed at a UE 120. At block 702, a dynamic SRS resource allocation is received. The dynamic SRS resource allocation may be, for example, from the pre-determined resource pool allocated to a group of UEs 120. At block 704, dynamic SRS is transmitted according to the received dynamic SRS resource allocation.

FIG. 8 shows a portion of a wireless communication apparatus 800 comprising module 802 for receiving a dynamic sounding reference signal SRS resource allocation and module 804 for transmitting SRS according to the received dynamic SRS resource allocation. The wireless device 800 and modules 802 and 804 may implement other techniques of dynamic SRS transmission, discussed herein.

In some designs, some common SRS subframes may be configured among cooperating cells. In some designs, the same cell-specific subframe configuration may be used for SRS in different cell. UEs 120, which are operating in multiple cells (using CoMP), may be able to transmit SRS signals in any of the SRS opportunities available to them. However, in certain designs, the coordinated multi point transmission (CoMP) UEs 120 may be limited to transmit SRS only in the SRS subframes common to the cooperating cells.

When CoMP UEs 120 are limited to operate on SRS subframes common to cooperating cells, inter-cell orthogonalization of SRS transmissions may be realized by having different cells configure different frequency combs for different CoMP UEs 120 so that the CoMP UEs 120 transmit orthogonally in the frequency domain (i.e., non-overlapping frequencies). The selection of a frequency comb (i.e., a set of carriers) may be coordinated among multiple eNBs 110 to achieve the frequency domain orthogonality.

It may be appreciated that, in some designs, the exclusive allocation of SRS resources to CoMP UEs 120, combined with orthogonalization of resource allocation among cooperating UEs 120, enables SRS transmissions from all UEs 120 in a cell with reduced or no collision among SRS transmissions.

In some designs, different cells may configure different SRS bandwidth ($B_{SRS}$) and different SRS resource allocation ($n_{SRS}$) for different CoMP UEs 120 in a way such that the CoMP UEs 120 transmit SRS that are orthogonal (or non-overlapping) in frequency.

In some designs, different cells may configure different SRS configuration index ($I_{SRS}$) for different CoMP UEs 120. The selection of $I_{SRS}$ may thus result in values for SRS periodicity ($T_{SRS}$) and SRS subframe offset ($T_{offset}$) such that transmissions from different CoMP UEs 120 are orthogonal in the time domain.

In some designs, different cells may configure different cyclic shifts for different CoMP UEs 120 in a way such that the CoMP UEs 120 transmit SRS that are orthogonal in the code domain.

In each of the cooperating cell, the remaining resources that are orthogonal to the resources assigned to those CoMP UEs 120 may be used for the remaining non-CoMP UEs 120 served by that cooperating cell.

An illustrative example of time domain orthogonality of SRS resources assigned to CoMP UEs 120 is provided below with reference to FIGS. 9 and 10. In some configurations, when CoMP UEs 120 may transmit at different transmit power levels, the time domain orthogonality may be preferred over a frequency comb for SRS orthogonalization because interference from a high power carrier at a neighboring frequency may be avoided by time domain orthogonalization.

Figure 9:
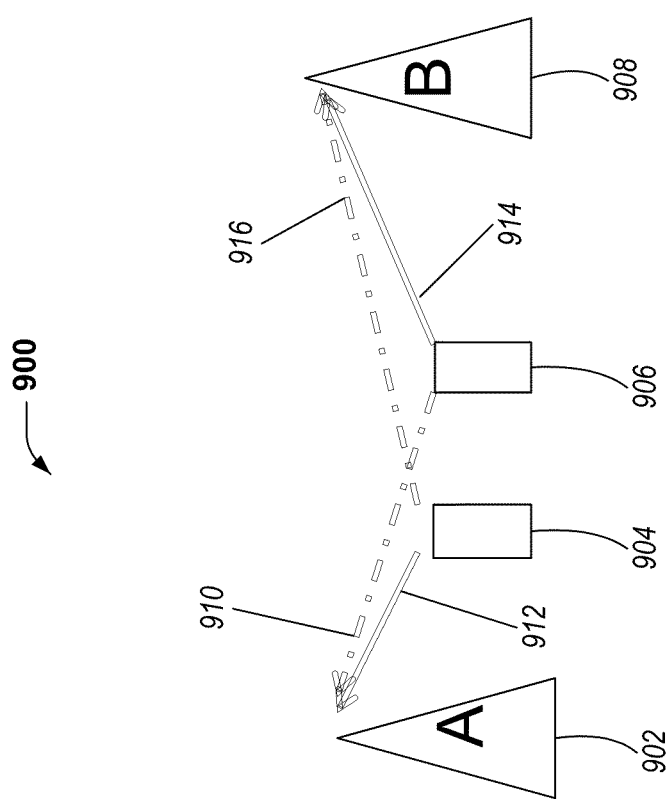
FIG. 9 illustrates a block diagram representation of a multi-cell wireless communication system.

FIG. 9 depicts a multi-cell wireless communication system 900. Base station A 902 serves a first cell (Cell A, not shown in FIG. 9) and base station B 908 serves a second cell (Cell B, not shown in FIG. 9). The UE 904 is served by the base station 902 via a communication channel 912 and is also able to receive/transmit signals with the base station 908 over a communication channel 916. The UE 906 is served by the base station 908 (i.e., communication channel 914) and is also able to communicate with the base station 902 over the communication channel 910.

Figure 10:
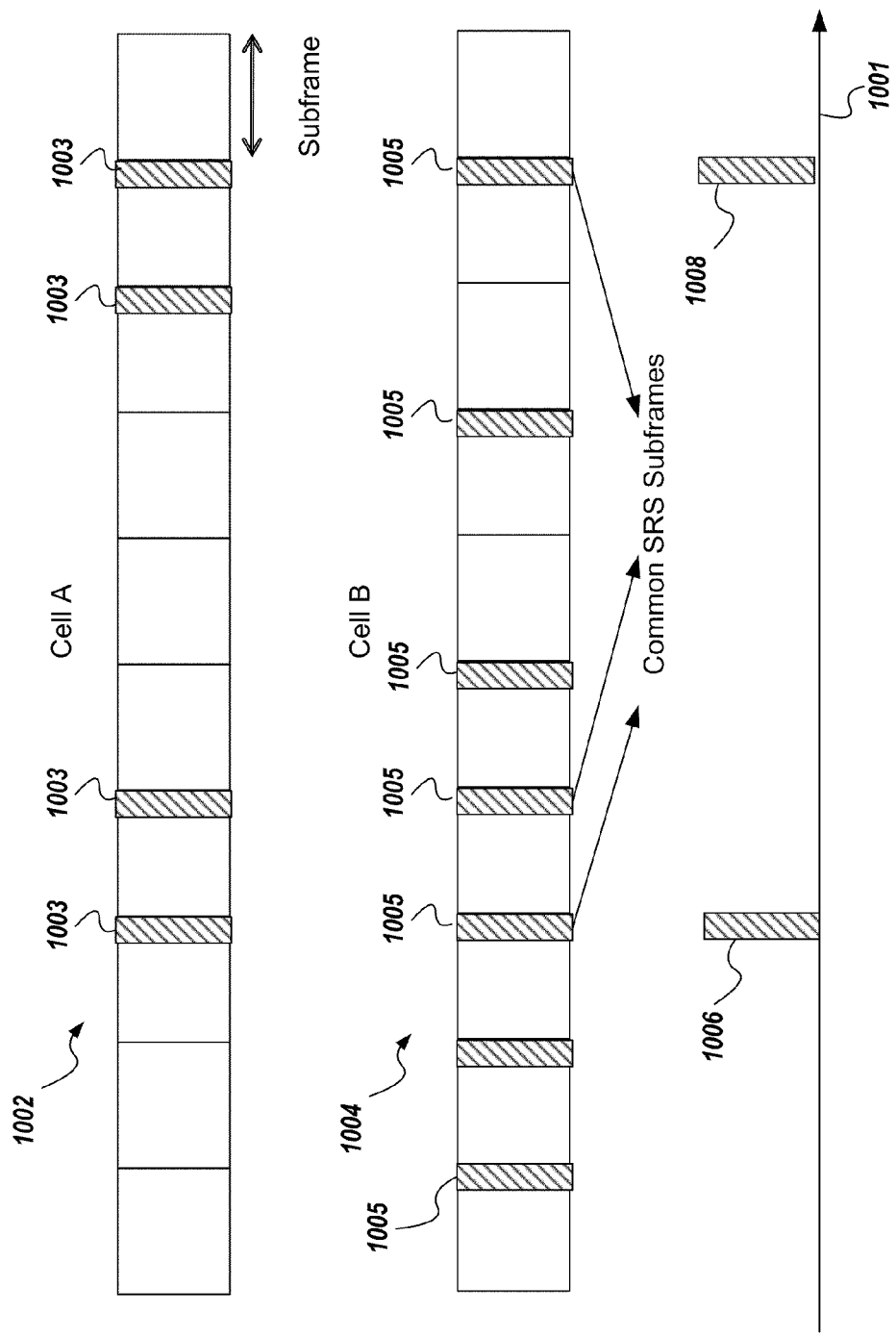
FIG. 10 illustrates a sequence of subframes, transmitted in a wireless communication system.

FIG. 10 shows an example assignment of SRS transmission resources with references to Cells A and B of FIG. 9, plotted along the horizontal axis 1001, representing time. The subframe arrangement 1002 may represent a timing sequence of subframe assignments in Cell A, based on the following values assigned to various SRS parameters:

$$\text{srsSubframeConfiguration}=8, => T_{SFC}=5, \Delta_{SFC}=\{2,3\} \qquad \text{Eq. (1)}$$

Therefore, in cell A, SRS transmissions are permitted in a subframe pattern periodic with a period of 5 subframes, calculated modulo 2 and modulo 3. The possible SRS transmissions, according to Eq. (1) are shown by shaded transmission slots 1003.

Similarly, subframe arrangement 1004 represents SRS assignment in Cell B, with the following values assigned to various parameters.

$$\text{srsSubframeConfiguration}=13, => T_{SFC}=10, \Delta_{SFC}=\{0,1,2,3,4,6,8\} \qquad \text{Eq. (2)}$$

Therefore, in cell B, SRS transmissions are permitted in a subframe pattern periodic with a period of 10 subframes, calculated modulo 0, 1, 2, 3, 4, 6 and 8. The possible SRS transmission times for Cell B, based on Eq. (2), are shown by shaded transmission slots 1005. It may be seen that the transmission time slots 1006, 1008 represents the time overlap between resources 1003 in Cell A, and resources 1005 in Cell B. To avoid interference on SRS transmissions, the shared or common SRS transmission time slots may be allocated to UEs 120 in different cells by coordinating as follows.

In the depicted example, the first UE 904 is configured with the parameters $I_{SRS}=9$. In other words, the first UE 904 is configured to transmit with a period $T_{SRS}=10$, and offset $T_{offset}=2$. Similarly, UE 906 may be configured with $I_{SRS}=15$. In other words, the UE 906 is configured to transmit with a period $T_{SRS}=10$, and offset $T_{offset}=8$. As will be seen from FIG. 10, UE 904 may transmit in time slot 1006 and UE 906 may transmit in time slot 1008. It will be appreciated that, based on the above scheme, the common time slots between neighboring cells A and B may therefore be allocated to different UEs for SRS transmissions in such a manner that there is no (or minimal) overlap between transmission times, thereby mitigating interference between SRS transmissions from CoMP UEs 120.

FIG. 11 depicts a flow chart showing an example process 1100 of wireless communication. At block 1102, a plurality of common sounding reference signal (SRS) subframes shared with one or more cooperating cells are configured. The shared common SRS subframes may be configured, for example, by messages exchanged between eNBs 110 of neighboring cells. At block 1104, an SRS configuration parameter is provided to a wireless device to facilitate an orthogonal SRS transmission over at least one of the plurality of common SRS subframes. In some designs, the providing includes allocating a frequency comb to the wireless device that facilitates orthogonality between SRS transmissions from the wireless device and SRS transmissions from a plurality of disparate wireless devices over the plurality of common SRS subframes. The frequency comb assignment may be performed, for example, using techniques described with respect to Eqs. (1) and (2).

In some designs, the providing the configuration parameter includes allocating a portion of bandwidth in at least one of the plurality of common SRS subframes to the wireless device that facilitates orthogonality between SRS transmissions from the wireless device and SRS transmissions from a plurality of disparate wireless devices over the plurality of common SRS subframes.

In some designs, the providing the configuration parameter includes providing the SRS configuration parameter to the wireless device by providing a configuration index to the wireless device that facilitates orthogonality between SRS transmissions from the wireless device and SRS transmissions from a plurality of disparate wireless devices over the plurality of common SRS subframes.

In some designs, the providing the configuration parameter includes providing the SRS configuration parameter to the wireless device that includes providing a cyclic shift to the wireless device for transmitting SRSs that facilitates orthogonality between SRS transmissions from the wireless device and SRS transmissions from a plurality of disparate wireless devices over the plurality of common SRS subframes. In some designs the cyclic shift based orthogonality may be achieved in the code domain.

FIG. 12 is a block diagram representation of a portion of a wireless communication apparatus 1200 comprising module 1202 for configuring a plurality of common sounding reference signal (SRS) subframes shared with one or more cooperating cells and module 1204 for providing an SRS configuration parameter to a wireless device to facilitate an orthogonal SRS transmission over at least one of the plurality of common SRS subframes.

FIG. 13 is a flow chart representation of an example process 1300 of wireless communication. The process 1300 may be implemented at, for example, a UE 120. At block 1302, a sounding reference signal (SRS) configuration parameter is received. As described above, the SRS configuration parameter may facilitate orthogonal SRS transmissions among neighboring cells. At block 1304, an SRS transmission based on the received SRS configuration parameter is performed in a subframe common with another cell (that is, a subframe in which an SRS transmission opportunity would also have been available to the other cell, without any cooperation between the cells).

FIG. 14 is a block diagram representation of a portion of a wireless communication apparatus 1400 comprising module 1402 for receiving a sounding reference signal (SRS) configuration parameter and module 1404 for performing, based on the received SRS configuration parameter, an SRS transmission in a subframe common with another cell.

Heterogeneous Network (HetNet) have been proposed in LTE-A to improve system performance through deployment with different classes of eNBs 110. For example, depending on the architecture of the serving cell (e.g., macro, micro, pico, or femto), eNBs 110 may have different transmit power limits. Furthermore, eNBs 110 may limit access depending on the served cell (e.g., open, restricted or hybrid access). As an example, a femto eNB (sometimes called a home eNB) may restrict association such that only a particular set of UEs 120 are allowed to access the network. Furthermore, different eNBs 110 may implement different backhaul schemes (e.g., In-Band or Out-of-Band). As an example, a relay node may employ in-band backhaul.

It will be appreciated by one of skill in the art that, in some wireless network deployments, e.g. closed subscriber group (CSG) with femto eNBs, it may not be possible to rely on backhaul communication to coordinate SRS configurations among different cells to achieve a non-overlapping uplink channel SRS performance at both a serving cell and the neighboring cells.

In Rel-8, when frequency hopping of SRS is enabled, the same hopping pattern is utilized. In other words, it is possible that SRS transmissions from different cells may have a complete overlap, even when frequency hopping is enabled.

In some designs, randomized SRS hopping patterns in different cells are implemented. In one aspect, due to randomization across cells, collisions of hopped SRS transmissions from different cells may either be substantially reduced or completely eliminated. Further details of the randomization across cells are described below.

In Rel-8 hopping is performed according to the following equations:

$$k_0 = k'_0 + \sum_{b=0}^{B_{SRS}} 12 m_{SRS,b} n_b; \qquad \text{Eq. (3)}$$

$$n_b = \begin{cases} \lfloor 4 n_{RRC} / m_{SRS,b} \rfloor \bmod N_b, & b \leq b_{hop} \\ (F_b(n_{SRS}) + \lfloor 4 n_{RRC} / m_{SRS,b} \rfloor) \bmod N_b, & \text{otherwise} \end{cases} \qquad \text{Eq. (4)}$$

The parameter $k_0$ decides the SRS bandwidth used in each hop. In Eqs. (3) and (4), where $n_{SRS}$ is a counter for the number of UE-specific SRS transmissions, $n_{RRC}$ is a parameter that relates to the frequency domain position of SRS, and $F_b(n_{SRS})$ is a function with the following characteristics:

$F_b(n_{SRS})$ is periodic with period $$T_b = \prod_{b'=b_{hop}+1}^{b} N_{b'}$$

$F_{b+1}(n_{SRS})$ is piecewise constant, with each constant segment having a length $T_b$.

Table 1 shows an example assignment of various parameters used in Eqs. (3) and (4).

TABLE 1

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Figure 15:
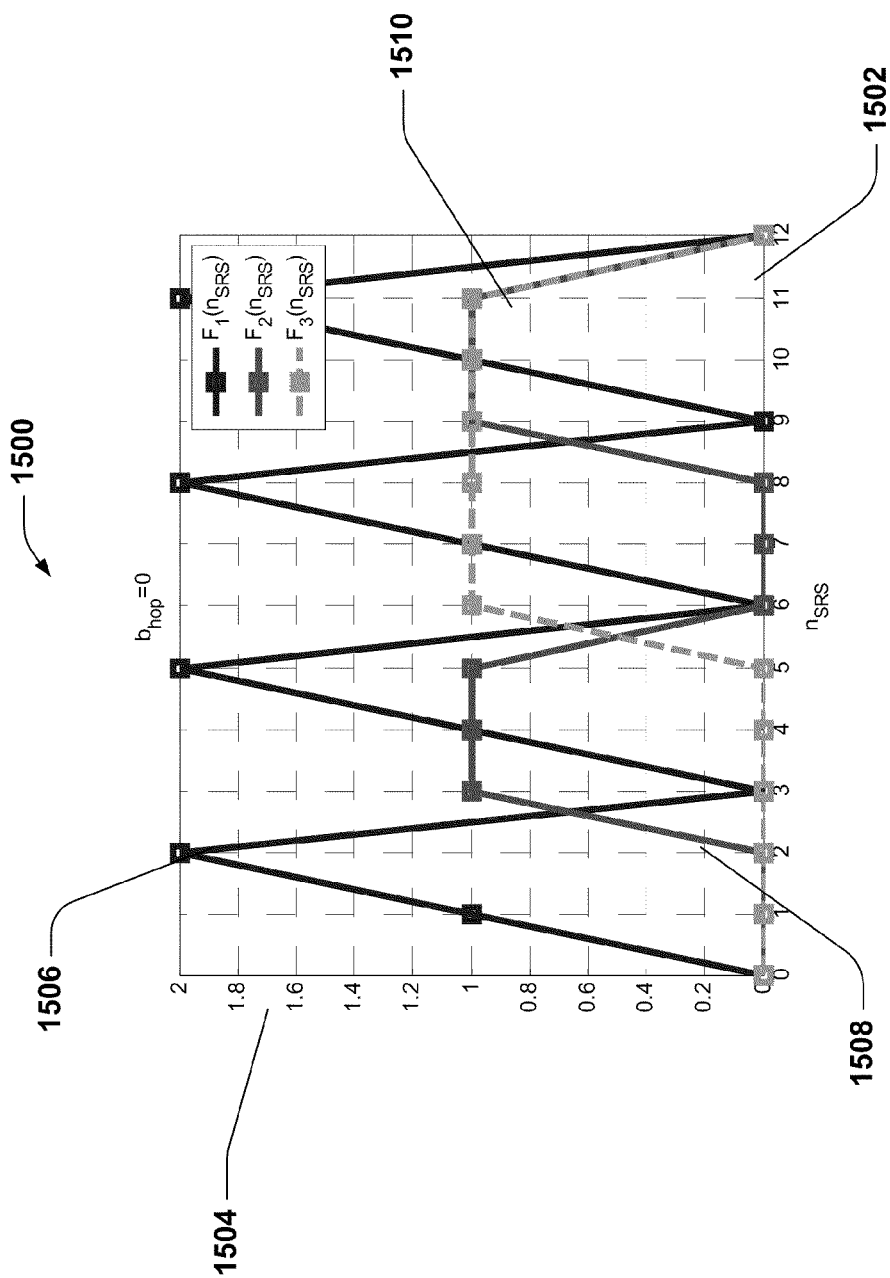
FIG. 15 illustrates a chart depicting an example of a function for assigning sounding reference signal resources in a wireless communication system.

FIG. 15 shows a chart 1500 depicting example functions $F_b(\ )$ for value b=1 (curve 1506), b=2 (curve 1508) and b=3 (curve 1510), plotted along horizontal axis 1502, representing $n_{SRS}$, and vertical axis 1504, representing integer values of the functions. As can be seen from chart 1500, the function $F_b$. For generation of chart 1500, it is assumed that uplink BW is 50 RB and SRS bandwidth is configured to be "configuration 1," implying 48 RBs of bandwidth, $b_{hop}=0$ (representing the total bandwidth over which hopping is performed) and $B_{SRS}=3$.

It can be seen from chart 1500 that $F_1$ changes faster than $F_2$ and $F_2$ changes faster than $F_3$, as a function of $n_{SRS}$. Furthermore, while $F_1$ takes on values 0, 1, and 2, $F_2$ and $F_3$ are limited to values 0 and 1. As can be seen from Eq. (4), the parameters $n_1$, $n_2$ and $n_3$ depend on $F_1$, $F_2$ and $F_3$ respectively. With reference again to FIG. 3, it will be seen that the hopping achieved by the above-described behavior of functions $F_1$, $F_2$ and $F_3$ above traverses through the node at each level (groups 302, 304, 306) at different frequencies. As can be seen, for the functions depicted in chart 1500, level 1 grouping (column 302) is hopped at the fastest rate, followed by level 2 grouping (column 304), followed by level 3 grouping (column 306).

In some designs, the function $F_b(\ )$ may be substituted with another function $U_b(n_{SRS})$. Therefore, Eq. (4) above may be modified as follows:

$$n_b = \begin{cases} \lfloor 4n_{RRC}/m_{SRS,b} \rfloor \bmod N_b, & b \leq b_{hop} \\ (U_b(n_{SRS}) + \lfloor 4n_{RRC}/m_{SRS,b} \rfloor) \bmod N_b, & \text{otherwise} \end{cases} \quad \text{Eq. (5)}$$

The function $U_b(\ )$ may have the following properties: $U_b(n_{SRS})$ is periodic with period:

$$T_b = \prod_{b'=b_{hop}+1}^{b} N_{b'}$$

$U_{b+1}(n_{SRS})$ is piece-wise constant with each constant segment of length $T_b$; and $U_b(n_{SRS})$ experiences all numbers in [0, Nb−1] in one period.

In some designs, the function $U_b(\ )$ may be evaluated as a cell-specific function, thereby resulting in cell-specific hopping. In some designs, construction of function $U_b(\ )$ within a cell may be changed across different sounding periods, to further randomize the hopping. It will be appreciated that several characteristics of the function $U_b(\ )$ are similar to that of the function $F_b(\ )$ previously discussed.

Figure 16:
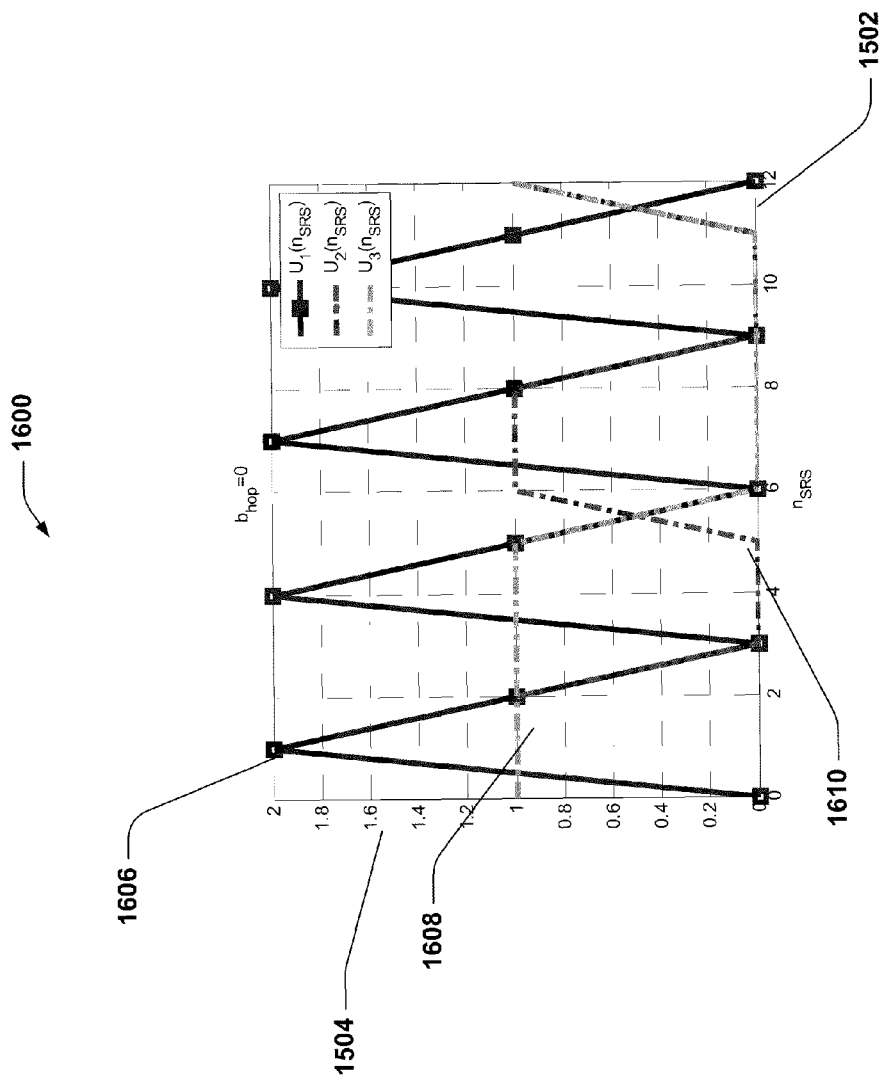
FIG. 16 illustrates a chart depicting an example of a function for assigning sounding reference signal resources in a wireless communication system.

FIG. 16 shows a chart 1600 depicting examples of the above-discussed $U_b(\ )$ function, showing $U_1$ (curve 1606), $U_2$ (curve 1608) and $U_3$ (curve 1610), plotted as a function of $n_{SRS}$ (horizontal axis 1602), the functions having integer values (vertical axis 1604). Similar to the chart 1500 of FIG. 15, the same bandwidth of 50 RBs and 48 RBs for SRS is assumed for chart 1600. In this case, $N_1=3$, $N_2=2$ and $N_3=2$, resulting in $T_1=3$, $T_2=6$ and $T_3=12$.

In some designs, the function $U_b(\ )$ may be chosen to be a randomly shifted version of the function $F_b(\ )$ Eq. (4) may be modified as follows:

$$n_b = \begin{cases} \lfloor 4n_{RRC}/m_{SRS,b} \rfloor \bmod N_b, & b \leq b_{hop} \\ (U_b(n_{SRS}) + \lfloor 4n_{RRC}/m_{SRS,b} \rfloor) \bmod N_b, & \text{otherwise} \end{cases} ; \quad \text{Eq. (7)}$$

$$U_b(n_{SRS}) = F_b(n_{SRS} + \Delta_b); \quad \text{Eq. (8)}$$

wherein $\Delta_b$ is a cell-specific cyclic shift parameter which may be semi-statically signaled by a higher layer. In some designs, the cell-specific cyclic shift parameter $\Delta_b$ may be a predetermined standardized function of a physical layer cell identification or a global cell identification $N_{ID}$.

Figure 17:
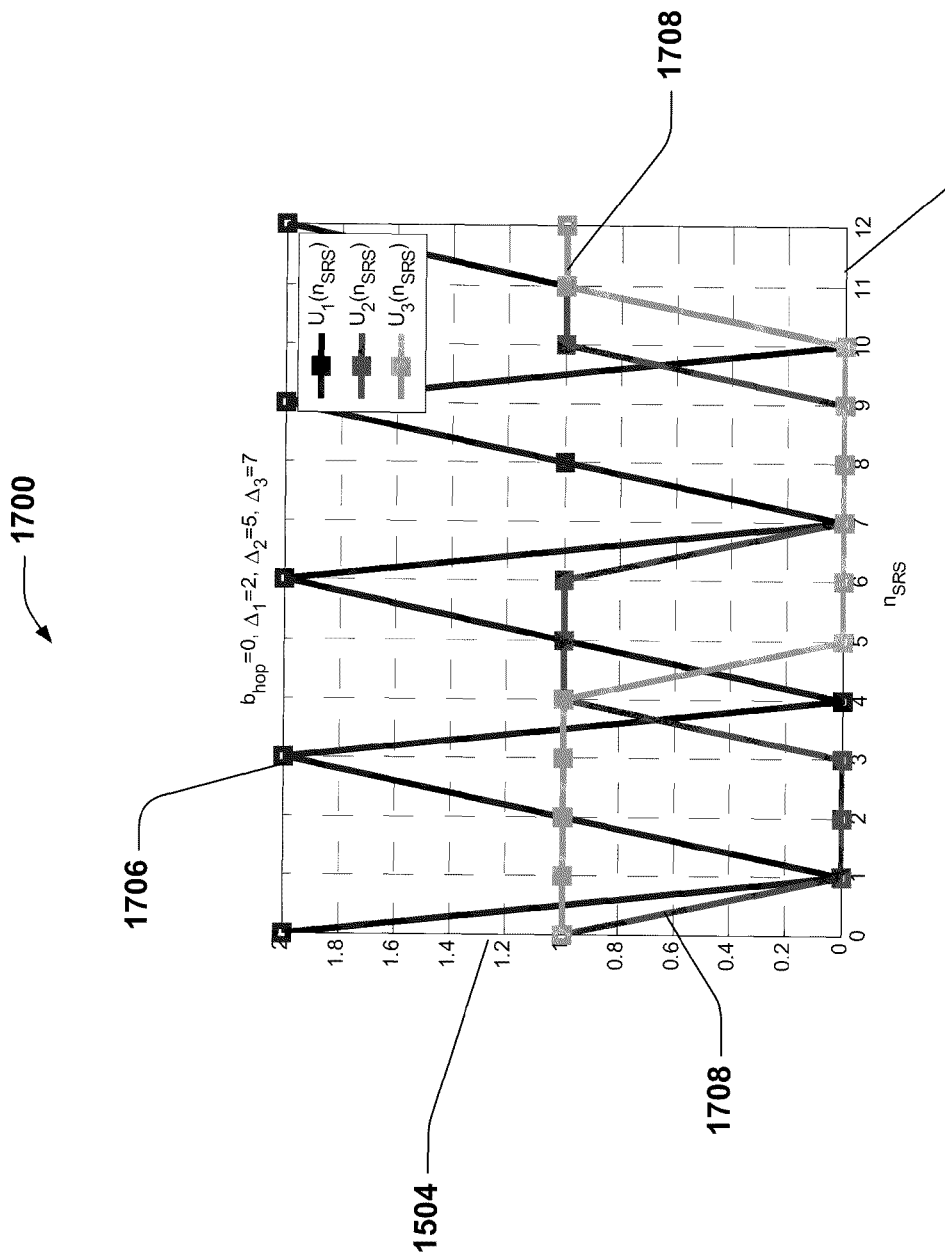
FIG. 17 illustrates a chart depicting an example of a function for assigning sounding reference signal resources in a wireless communication system.

FIG. 17 shows a chart 1700, depicting functions $U_1(\ )$ $U_2(\ )$ and $U_3(\ )$ (curves 1706, 1708 and 1710 respectively) obtained using the shifting operation described with respect to Eqs. (7) and (8), based on the functions previously shown in FIG. 15. The following values of the cell-specific parameters are used in the chart 1700: $\Delta_1=2$, $\Delta_2=5$ and $\Delta_3=7$. It may be appreciated that by using different values of the cell-specific parameters $\Delta_b$, randomized RB assignments for SRS may be obtained. In some designs, the $\Delta_b$ value used for a particular value of b may also be changed over time, adding more randomization to hopping. For example, $\Delta_b$ values may be changed over every T milliseconds, where T>the sounding period used for hopping.

Figure 18:
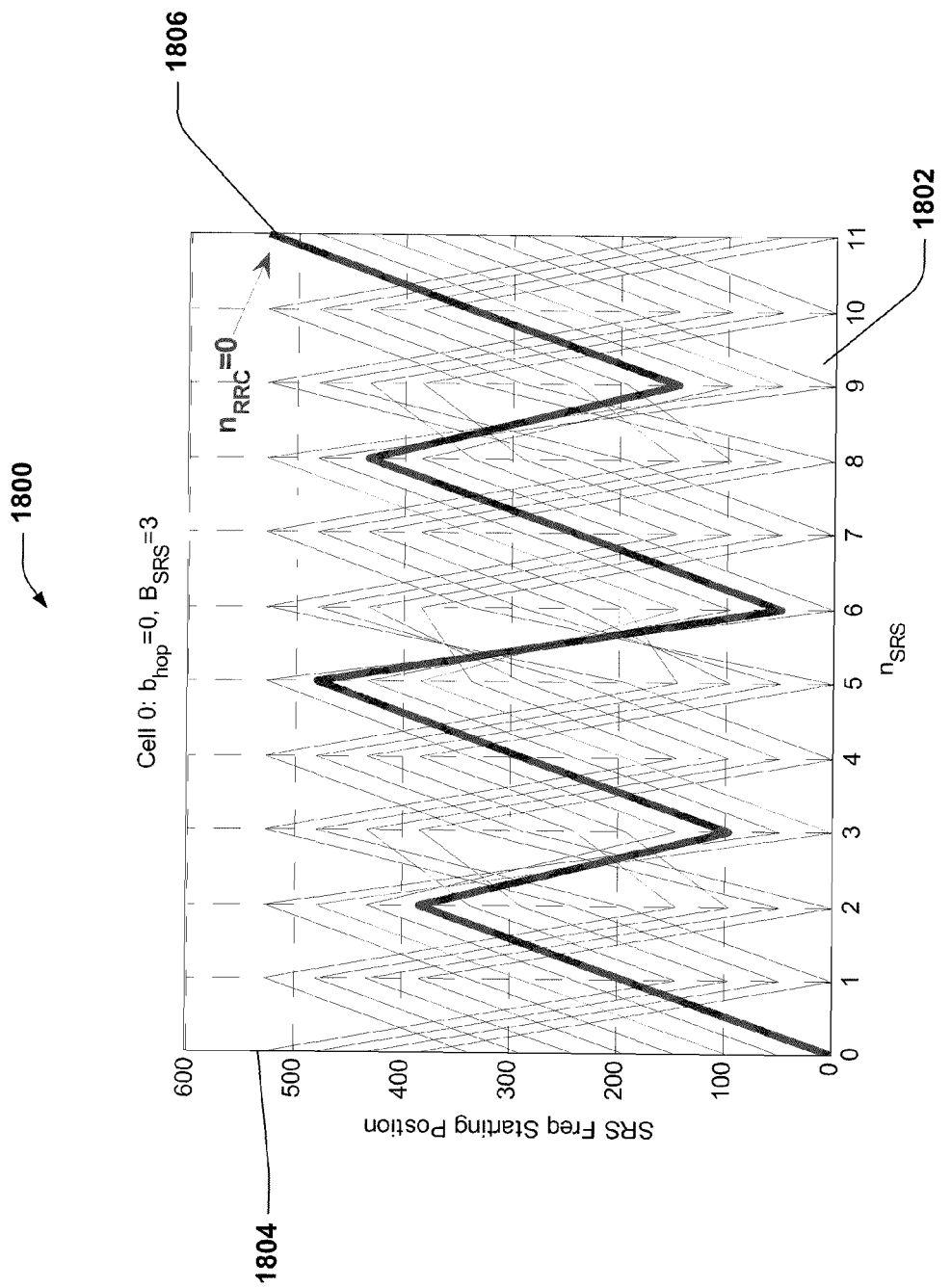
FIG. 18 illustrates a chart depicting an example of a function for assigning sounding reference signal resources in a wireless communication system.
Figure 19:
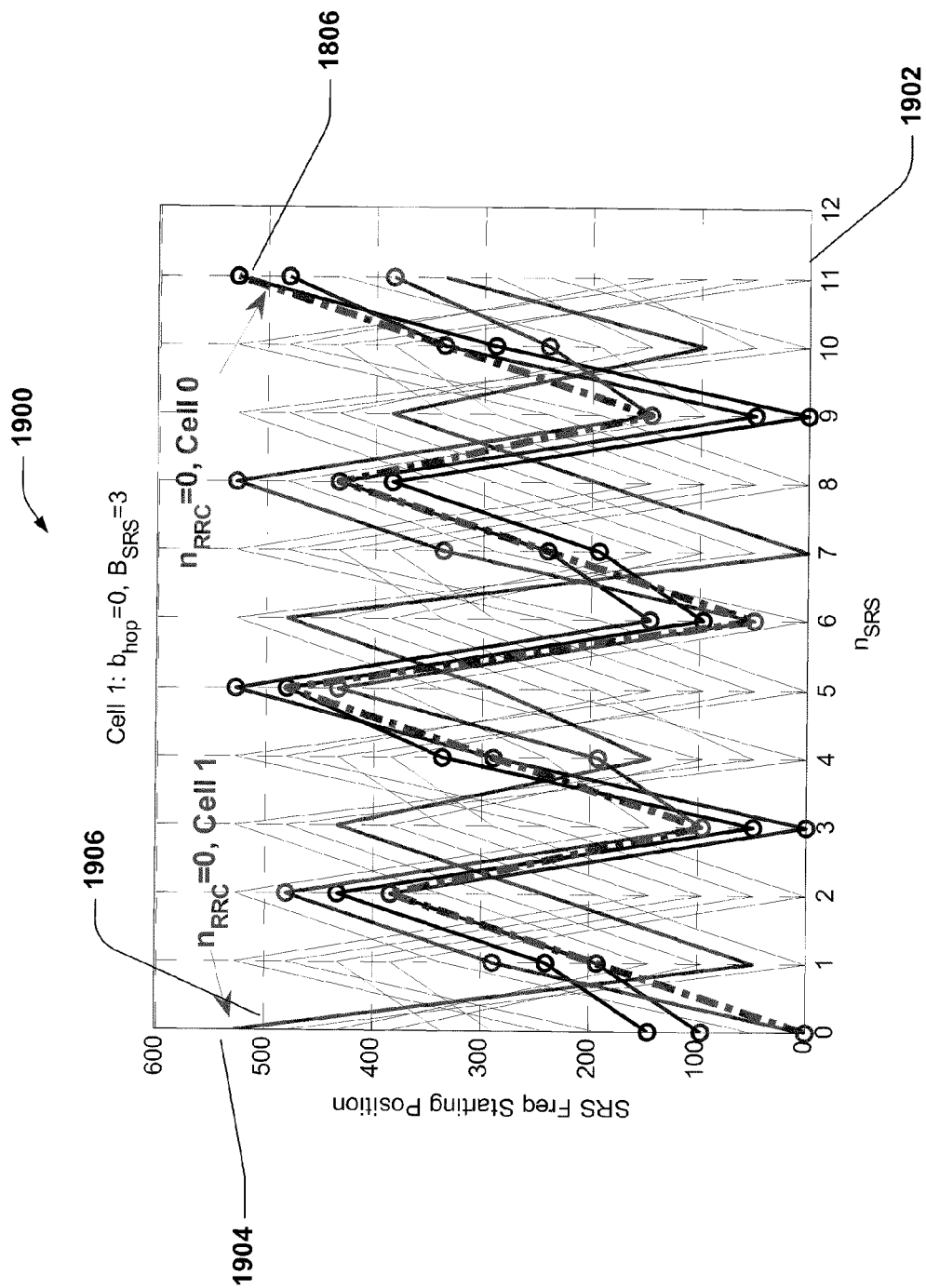
FIG. 19 illustrates a chart depicting an example of a function for assigning sounding reference signal resources in a wireless communication system.

With reference to FIGS. 18 and 19, SRS starting frequency patterns for two different cells, cell 0 and cell 1, generated using the above discussed Eqs. (7) and (8) are shown to highlight an aspect of the function $U_b(\ )$ as defined in Eqs. (7) and (8). It may be appreciated that at a given time, the starting SRS frequency offset positions for different cells are different, thereby avoiding collisions among SRS transmissions of different cells.

FIG. 18 illustrates a chart 1800, showing SRS frequency starting position along the vertical axis 1804 as a function of the $n_{SRS}$ parameter for various values of $n_{RRC}$ (set by the higher layer) for cell 0, along the horizontal axis 1802. In particular, curve 1806 may represent the starting SRS frequency, correspond to $n_{RRC}=0$. The following values of certain relevant parameters are assumed: uplink bandwidth=50 RBs, SRS bandwidth configuration=1 (total SRS BW=48), bhop=0, $b_{SRS}=3$. Furthermore it is assumed for cell 0, $\Delta_1=0$, $\Delta_2=0$ and $\Delta_3=0$.

FIG. 19 illustrates a chart 1900, showing SRS frequency starting position along the vertical axis 1904 as a function of the $n_{SRS}$ parameter for various values of $n_{RRC}$ (set by the higher layer) for cell 1, along the horizontal axis 1902. Curve 1906 shows the starting SRS frequency offset for cell 1, corresponding to $n_{RRC}=0$ for cell 1. For the ease of comparison, curve 1806 of chart 1800, corresponding to $n_{RRC}=0$ for cell 0 is also shown. The following values of certain relevant parameters are assumed: uplink bandwidth=50 RBs, SRS bandwidth configuration=1 (total SRS BW=48), bhop=0, $b_{SRS}=3$. and for cell 1, $\Delta_1=2$, $\Delta_2=5$ and $\Delta_3=7$. In particular, starting offsets for cell 0 (curve 1806) and cell 1 (curve 1906) are shown in FIG. 19.

It will be appreciated that the starting offsets for the same $n_{RRC}$ values in cell 0 and cell are different and do not overlap completely, thereby minimizing collisions of SRS transmissions between two cells. Furthermore, none of the functions in FIG. 19 has a complete overlap with each other, or with the corresponding function depicted by curves in FIG. 18, thereby ensuring that there is never a total overlap between SRS transmission hopping patterns for a given offset, of different cells. The same mathematical property of non-overlapping behavior of the functions may also be verified by those of skill in the art by analyzing the functions $U_b(\ )$ disclosed above.

In some designs, cell-specific SRS frequency hopping may be achieved by selecting a hopping sequence as follows. Assume that a total of N hops will be used to sound the required bandwidth. Let {0, 1, . . . , N−1} denote the corresponding sounding BW in each hop. Theoretically, up to N! (N factorial) different hopping sequences that can sound the required BW through N hops, may be possible. In some designs, to achieve randomized hopping across different cells, each cell may select one hopping sequence according to the cell's physical layer cell ID (PCI). For example, in some designs, a cell with PCI $N_{ID}$, may select the hopping sequence with index: mod($N_{ID}$, N!) from the N! available hopping sequences.

Assuming a cell selects a hopping sequence $\{I_0, I_1, \ldots, I_{N-1}\}$ for $n_{RRC}=0$, then the hopping sequences for other values of $n_{RRC}$ can be generated as follows. In some designs, cyclic shifts of the hopping sequence $\{I_0, I_1, \ldots, I_{N-1}\}$ may be performed. In some designs, a shift may be performed using the hopping sequence:

$$\{\mathrm{mod}(I_0+X,N), \mathrm{mod}(I_1+X,N), \ldots, \mathrm{mod}(I_{N-1}+X,N)\}, \qquad \text{Eq. (9)}$$

where N is the length of the sequence, with X being a function of $n_{RRC}$.

As an illustrative example, in some designs 48 RBs may be sounded in 12 hops with 4 RBs being sounded in each hop. Let each consecutive 4 RBs within 32 RBs be indexed from 0 to 11. For example, 0 may correspond to RBs 0-3, 1 corresponds to RBs 4-7, and so on.

For Cell 0 hopping sequence for $n_{RRC}=0$ may be as follows. The index of sounding BW in each hop may be 0, 1, 2, 3, 4, 5, 6, 7, 8, 9, 10 and 11. For Cell 1 hopping sequence for $n_{RRC}=0$, index of sounding BW in each hop may be 3, 11, 4, 7, 0, 5, 2, 6, 1, 10, 8 and 9. It may be seen that the two index sequences (for cell 0 and cell 1) do not have an overlap with each other.

In some designs, time hopping of the starting resource index $n_{RRC}$ may be performed. In Rel-8, the starting physical resource block, $n_{RRC}$ is signaled from higher layers and remains the same value until being re-configured by higher layers. In LTE-A, to avoid catastrophic SRS collision from different cells, the starting resource index may be allowed to hop with time according to a cell-specific pattern. The $n_{RRC}$ may hop, for example, every sounding period. In some designs, pseudo-random timing hopping may be used to ensure that even if SRS transmissions from different cells occasionally collide, such collisions may not be catastrophic (e.g., less than 1 or 10 or 20 percent collisions).

For example, in one design, assuming that UE 0 is served by Cell 0, and UE 1 is served by Cell 1, then UE 0 time hopping sequence for $n_{RRC}$ in each sounding period may be 0, 1, 2, 3, 4, 5, 6, 7, 8, 9, 10 and 11. Similarly, UE 1 time hopping sequence for n in each sounding period may be 3, 11, 4, 7, 0, 5, 2, 6, 1, 10, 8, 9. It will be appreciated that the SRS from UE 0 and UE 1 will collide only at the 6th sounding period (value "5"). Therefore, in spite of such collisions, based on the non-colliding SRS transmissions, satisfactory channel sounding performance may still be achieved.

FIG. 20 shows a flow chart representation of a process 2000 of wireless communication. At block 2002, a cell-specific SRS frequency hopping pattern over SRS resources for a wireless device is determined. The SRS frequency hopping pattern may be based on one of the above discussed techniques, including, for example, the technique described with respect to Eq. (9). At block 2004, the cell-specific SRS frequency hopping pattern is assigned to the wireless device to mitigate collisions with SRS transmissions from other wireless devices. Additional SRS enhancement operations, described herein, may also be performed in the process 2000.

FIG. 21 shows a block diagram representation of a portion of a wireless communication apparatus 2100 comprising module 2100 for determining a cell-specific sounding reference signal (SRS) frequency hopping pattern over SRS resources for a wireless device and module 2104 for assigning the cell-specific SRS frequency hopping pattern to the wireless device to mitigate SRS collision with a disparate wireless device. The communication apparatus 2100 may further include modules to perform one or more SRS enhancements discussed herein.

FIG. 22 shows a flow chart representation of a process 2200 of wireless communication. At block 2202, a cell-specific sounding reference signal (SRS) frequency hopping pattern is received at a wireless device. At block 2204, SRS transmission resources are determined based on the received hopping pattern. At block 2206, an SRS transmission is performed according to the determined SRS transmission resources. Additional SRS enhancement operations, described herein, may also be performed in the process 2200.

FIG. 23 shows a block diagram representation of a portion of a wireless communication apparatus 2300 comprising module 2302 for receiving a cell-specific sounding reference signal (SRS) frequency hopping pattern at a wireless device, module 2304 for determining SRS transmission resources based on the received hopping pattern and module 2306 for performing an SRS transmission according to the determined SRS transmission resources. The wireless communication apparatus 2300 may further include modules to perform one or more SRS enhancements discussed herein.

It will be appreciated that several enhancements to sounding reference signal transmissions are described herein. In some designs, dynamic SRS resources may be made available to a wireless device based on a determination of whether the wireless device desires SRS resources. The determination may be made based on a request received from the wireless device or based on an operational criterion such as error rate or channel quality.

It will be appreciated that the disclosed enhancements may include cooperation among cells such that a plurality of common SRS subframes are shared by the cooperating cells and an SRS configuration parameter provided to a user equipment facilitates orthogonal transmission of SRS within the shared subframes.

It will be appreciated that the disclosed SRS enhancements include hopping the initial frequency offset for SRS transmission based on a function for determining a cell-specific SRS frequency hopping pattern to mitigate SRS transmissions with SRS transmissions from other wireless devices in another cell.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for wireless communication, comprising:
   determining whether a wireless device requires dynamic sounding reference signal (SRS) resources;
   providing a dynamic SRS resource allocation to the wireless device from a set of resources reserved for dynamic SRS transmissions when a determination is made that the dynamic SRS resources are required by the wireless device; wherein the resources reserved for dynamic SRS transmissions are in addition to resources allocated to the wireless device for periodic SRS transmissions; and
   signaling the dynamic SRS resource allocation to the wireless device in a scheduling grant.

2. The method of claim 1, wherein the determining includes receiving a request for the dynamic SRS resources from the wireless device.

3. The method of claim 1, wherein the providing includes signaling the dynamic SRS resource allocation along with a group of dynamic SRS resource allocations over a physical downlink control channel.

4. The method of claim 1, further comprising dynamically allocating semi-persistent SRS resources to the wireless device.

5. The method of claim 1, wherein the determining includes estimating an operational parameter for a communication channel with the wireless device.

6. The method of claim 5, wherein the operational parameter includes one of a traffic activity and an error rate for the communication channel with the wireless device.

7. The method of claim 1, further comprising configuring, semi-statically, the set of resources for the dynamic SRS resource allocation for the wireless device.

8. The method of claim 7, wherein the set of resources comprises orthogonal SRS resources.

9. A wireless communication apparatus, comprising:
a memory configured to store instructions to:
   determine whether a wireless device requires dynamic sounding reference signal (SRS) resources;
   provide a dynamic SRS resource allocation to the wireless device from a set of resources reserved for dynamic SRS transmissions when a determination is made that the dynamic SRS resources are required by the wireless device; wherein the resources reserved for dynamic SRS transmissions are in addition to resources allocated to the wireless device for periodic SRS transmissions; and
   signal the dynamic SRS resource allocation to the wireless device in a scheduling grant; and
a processor configured to execute the instructions from the memory.

10. The wireless communications apparatus of claim 9, wherein the memory further stores instructions to receive a request for the dynamic SRS resources from the wireless device.

11. The wireless communication apparatus of claim 9, wherein the memory further stores instructions to estimate an operational parameter for a communication channel with the wireless device.

12. An apparatus for wireless communication, comprising:
   means for determining whether a wireless device requires dynamic sounding reference signal (SRS) resources;
   means for providing a dynamic SRS resource allocation to the wireless device from a set of resources reserved for dynamic SRS transmissions when a determination is made that the dynamic SRS resources are required by the wireless device; wherein the resources reserved for dynamic SRS transmissions are in addition to resources allocated to the wireless device for periodic SRS transmissions; and
   means for signaling the dynamic SRS resource allocation to the wireless device in a scheduling grant.

13. A non-transitory computer-readable medium for storing instructions executable by a processor, comprising:
   instructions to determine whether a wireless device requires dynamic sounding reference signal (SRS) resources;
   instructions to provide a dynamic SRS resource allocation to the wireless device from a set of resources reserved for dynamic SRS transmissions when a determination is made that the dynamic SRS resources are required by the wireless device; wherein the resources reserved for dynamic SRS transmissions are in addition to resources allocated to the wireless device for periodic SRS transmissions; and
   instructions to signal the dynamic SRS resource allocation to the wireless device in a scheduling grant.

14. A method for wireless communication, comprising:
   receiving a dynamic sounding reference signal (SRS) resource allocation at a wireless device from a set of resources reserved for dynamic SRS transmissions; wherein the resources reserved for dynamic SRS transmissions are in addition to resources allocated to the wireless device for periodic SRS transmissions, and wherein the dynamic SRS resource allocation is received in an uplink or downlink scheduling grant; and
   transmitting SRS according to the dynamic SRS resource allocation.

15. The method of claim 14, further comprising:
   determining whether dynamic SRS resources are needed; and
   requesting, based on the determination, the dynamic SRS resources.

16. A wireless communication apparatus, comprising:
a memory configured to store instructions to:
   receive at the wireless communication apparatus a dynamic sounding reference signal (SRS) resource allocation from a set of resources reserved for dynamic SRS transmissions; wherein the resources reserved for dynamic SRS transmissions are in addition to resources allocated to the wireless communication apparatus for periodic SRS transmissions, and wherein the dynamic SRS resource allocation is received in an uplink or downlink scheduling grant; and
   transmit SRS according to the dynamic SRS resource allocation; and
a processor configured to execute the instructions from the memory.

17. A wireless communication apparatus, comprising:
   means for receiving, at the wireless communication apparatus, a dynamic sounding reference signal (SRS) resource allocation from a set of resources reserved for dynamic SRS transmissions; wherein the resources reserved for dynamic SRS transmissions are in addition to resources allocated to the wireless communication apparatus for periodic SRS transmissions, and wherein the dynamic SRS resource allocation is received in an uplink or downlink scheduling grant; and
   means for transmitting SRS according to the dynamic SRS resource allocation.

18. A non-transitory computer-readable medium for storing instructions executable by a processor, comprising:
   instructions to receive a dynamic sounding reference signal (SRS) resource allocation at a wireless device from a set of resources reserved for dynamic SRS transmissions; wherein the resources reserved for dynamic SRS transmissions are in addition to resources allocated to the wireless device for periodic SRS transmissions, and wherein the dynamic SRS resource allocation is received in an uplink or downlink scheduling grant; and
   instructions to transmit SRS according to the receiving dynamic SRS resource allocation.

* * * * *